(12) United States Patent
Harada et al.

(10) Patent No.: US 10,341,538 B2
(45) Date of Patent: Jul. 2, 2019

(54) DISPLAY SYSTEM AND DISPLAY METHOD

(71) Applicant: Japan Display Inc., Tokyo (JP)

(72) Inventors: Tsutomu Harada, Tokyo (JP);
Kazunori Yamaguchi, Tokyo (JP);
Akira Sakaigawa, Tokyo (JP);
Fumitaka Gotoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/824,156

(22) Filed: Nov. 28, 2017

(65) Prior Publication Data

US 2018/0084159 A1 Mar. 22, 2018

Related U.S. Application Data

(63) Continuation of application No. PCT/JP2016/065831, filed on May 27, 2016.

(30) Foreign Application Priority Data

May 29, 2015 (JP) .................. 2015-110816

(51) Int. Cl.
| | |
|---|---|
| *H04N 5/225* | (2006.01) |
| *H04N 5/05* | (2006.01) |
| *H04N 5/08* | (2006.01) |
| *H04N 9/44* | (2006.01) |
| *H04N 5/073* | (2006.01) |
| *H04N 7/18* | (2006.01) |
| *H04N 5/265* | (2006.01) |

(52) U.S. Cl.
CPC .............. *H04N 5/225* (2013.01); *H04N 5/05* (2013.01); *H04N 5/0733* (2013.01); *H04N 5/08* (2013.01); *H04N 7/181* (2013.01); *H04N 9/44* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 5,828,367 A | 10/1998 | Kuga | |
| 2003/0048363 A1* | 3/2003 | Watanabe | H04N 5/235 |
| | | | 348/222.1 |
| 2011/0157317 A1 | 6/2011 | Kamiya et al. | |

FOREIGN PATENT DOCUMENTS

| | | |
|---|---|---|
| JP | 64-067079 A | 3/1989 |
| JP | 04-114267 A | 10/1992 |
| JP | 04-114267 U | 10/1992 |
| JP | 05-137143 A | 6/1993 |
| JP | 06-227315 A | 8/1994 |

(Continued)

*Primary Examiner* — Samira Monshi
(74) *Attorney, Agent, or Firm* — K&L Gates LLP

(57) ABSTRACT

A display system includes a controller and an image display panel. The controller includes a signal transmitter configured to output at least a vertical synchronization signal to a plurality of image-capturing apparatuses; and a synthesizer configured to provide synthesized image signals in units of lines obtained by synthesizing, in units of lines, image signals in units of lines output from the respective image-capturing apparatuses at a timing corresponding to a horizontal synchronization signal formed in a predetermined cycle based on an output timing of the vertical synchronization signal. The image display panel is configured to display sequentially, in units of lines, the synthesized image signals in units of lines.

12 Claims, 21 Drawing Sheets

(56) References Cited

FOREIGN PATENT DOCUMENTS

| | | |
|---|---|---|
| JP | 07-121133 A | 5/1995 |
| JP | 08-313869 | 11/1996 |
| JP | 08-313869 A | 11/1996 |
| JP | 10-186550 | 7/1998 |
| JP | 10-186550 A | 7/1998 |
| JP | 2003-158682 A | 5/2003 |
| JP | 2011-135294 A | 7/2011 |
| JP | 10-186550 | 12/2016 |
| WO | 2016/190372 A | 12/2016 |

* cited by examiner

FIG.8

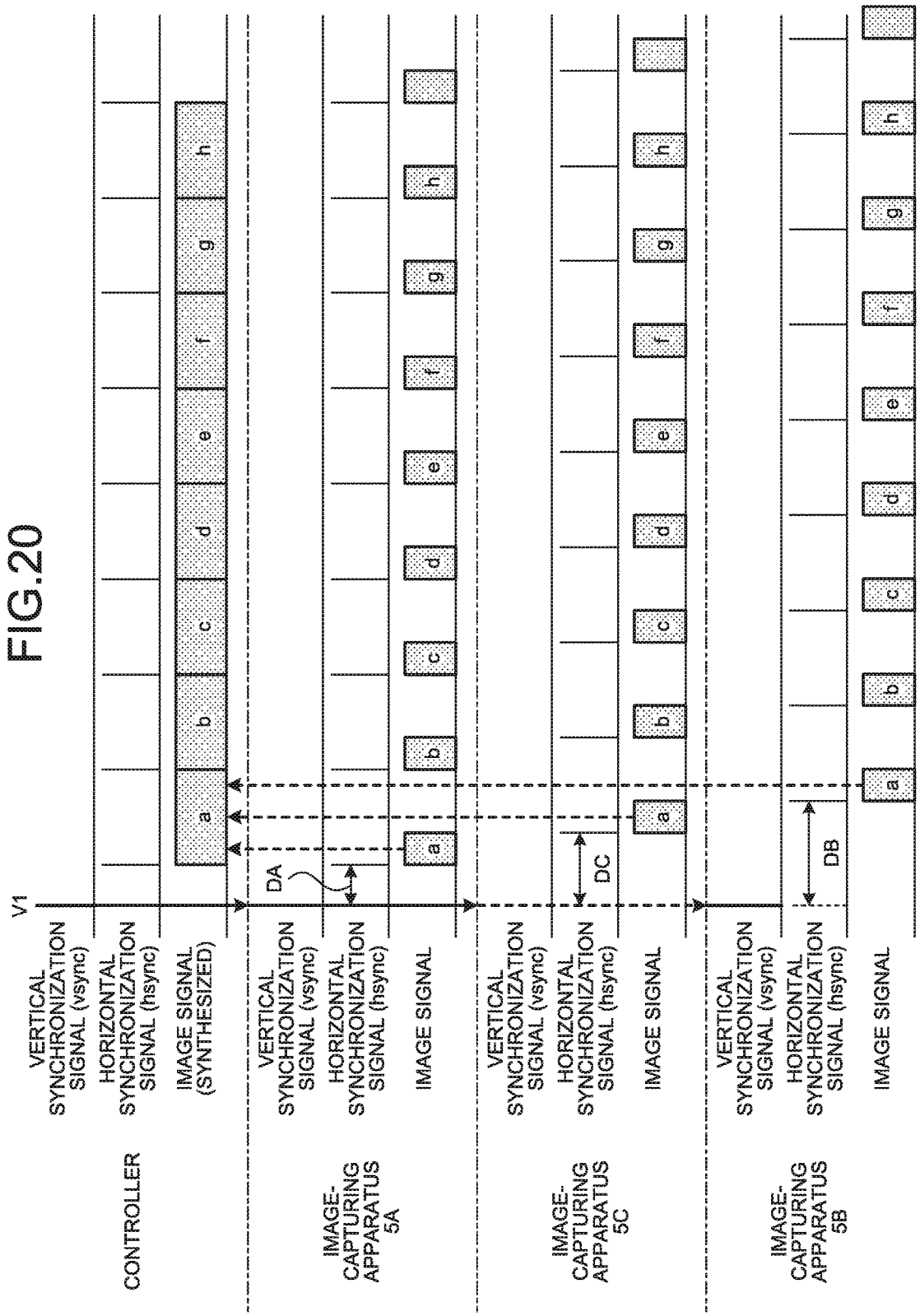

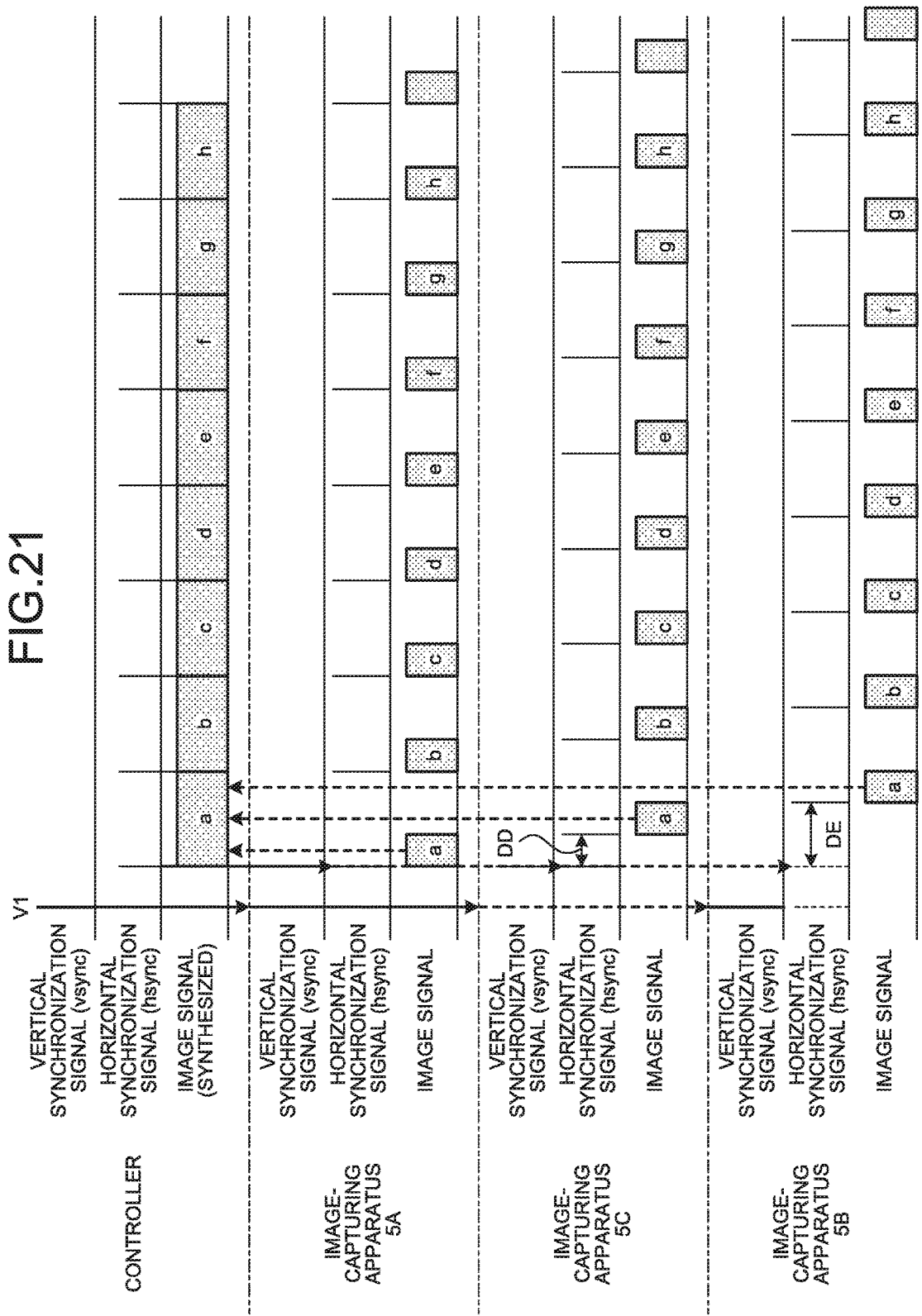

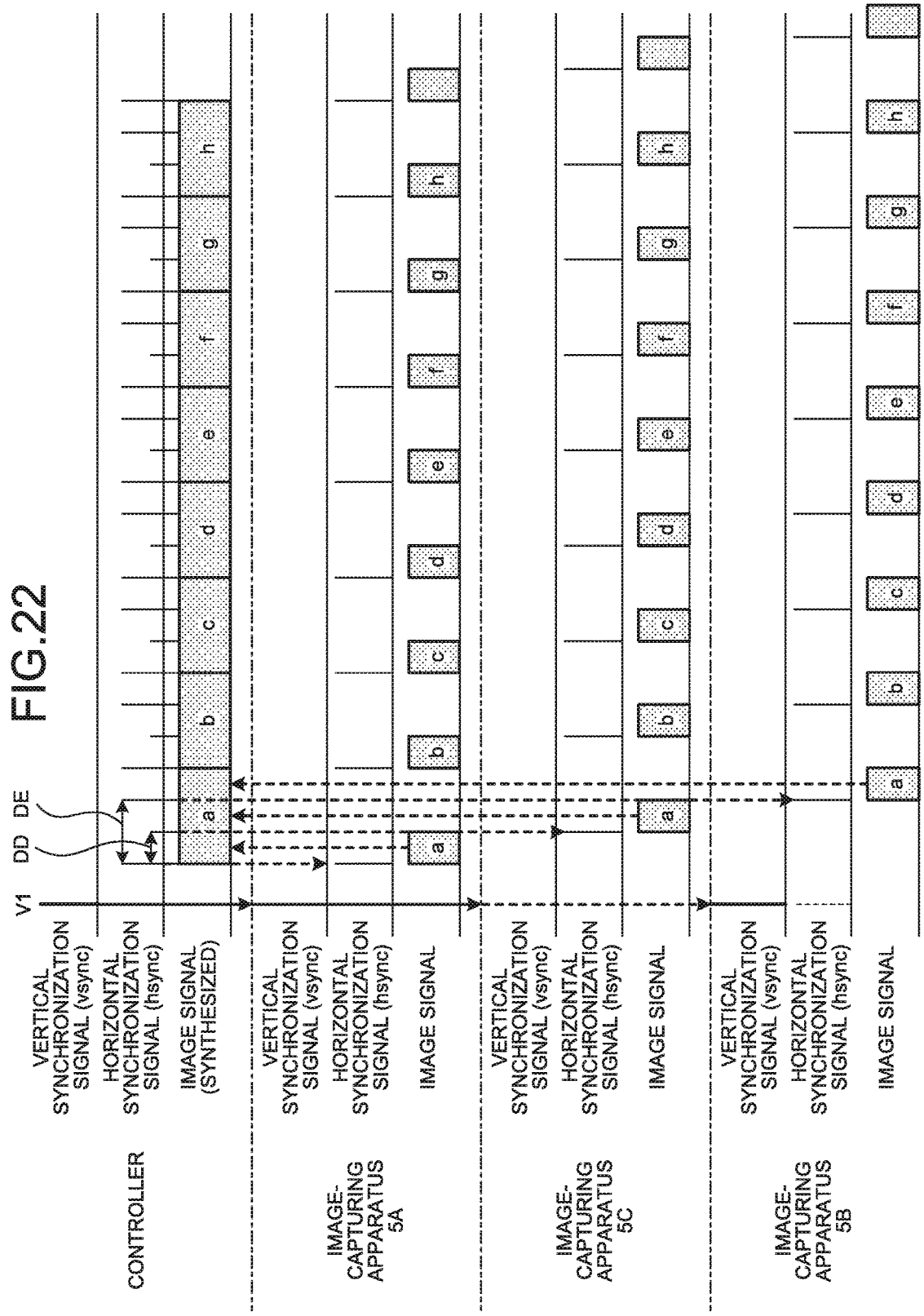

DISPLAY SYSTEM AND DISPLAY METHOD

CROSS-REFERENCE TO RELATED APPLICATION

This application is a continuation of International Application No. PCT/JP2016/065831 filed on May 27, 2016 which claims the benefit of priority of the prior Japanese Patent Application No. 2015-110816 filed on May 29, 2015, the entire contents of which are incorporated herein by reference.

BACKGROUND

1. Technical Field

The present invention relates to a display system and a display method.

2. Description of the Related Art

It is well known that there are display systems that include a plurality of image-capturing apparatuses, such as digital cameras, synthesize images taken by the image-capturing apparatuses, and display and output the synthesized image (e.g., Japanese Patent Application Laid-open Publication No. 2011-135294, and Japanese Patent Application Laid-open Publication No. H10-186550).

In the conventional display systems, however, an apparatus that synthesizes images acquires the images from the image-capturing apparatuses in units of frames and then synthesizes the images. After completing the synthesis of the frame images, the display systems display and output the images in units of frames. With this mechanism, the conventional display systems require a time of at least one frame until the image-capturing apparatuses complete outputting the frame images from an image-capturing start timing of the image-capturing apparatuses. Subsequently, the conventional display systems require a processing time to synthesize the frame images. To synthesize and display the images in units of frames, the conventional display systems transmit image data via a buffer (frame buffer) for the images in units of frames. As a result, the conventional display systems further require a time to input and output the image data via the buffer. These times correspond to a delay time from when the images are taken to when they are displayed, thereby degrading the real-time property of the synthesized image.

In the conventional display systems, especially those that are mounted on a movable body, such as a car, and that display images taken by a plurality of image-capturing apparatuses to monitor the states outside the movable body, a long delay time from when the images are taken to when they are displayed causes delay in a user's grasping the outside conditions. In such display systems, the delay time should not be disregarded in terms of safety.

For the foregoing reasons, there is a need for a display system and a display method that can reduce a delay time from when images are taken by a plurality of image-capturing apparatuses to when synthesized images obtained by synthesizing the images taken by the image-capturing apparatuses are displayed. Alternatively, there is a need for a display system and a display method that can improve the real-time property when the images taken by the image-capturing apparatuses are synthesized and displayed.

SUMMARY

According to an aspect of the present invention, a display system includes a controller and an image display panel. The controller includes a signal transmitter configured to output at least a vertical synchronization signal to a plurality of image-capturing apparatuses; and a synthesizer configured to provide synthesized image signals in units of lines obtained by synthesizing, in units of lines, image signals in units of lines output from the respective image-capturing apparatuses at a timing corresponding to a horizontal synchronization signal formed in a predetermined cycle based on an output timing of the vertical synchronization signal. The image display panel is configured to display sequentially, in units of lines, the synthesized image signals in units of lines.

According to another aspect of the present invention, a display system includes: a plurality of image-capturing apparatuses that output captured images in units of lines; a controller; and an image display panel. The controller includes a signal transmitter configured to output at least a vertical synchronization signal to the image-capturing apparatuses; and a synthesizer configured to provide synthesized image signals in units of lines obtained by synthesizing, in units of lines, image signals in units of lines output from the respective image-capturing apparatuses at a timing corresponding to a horizontal synchronization signal formed in a predetermined cycle based on an output timing of the vertical synchronization signal. The image display panel is configured to display sequentially, in units of lines, the synthesized image signals in units of lines.

According to another aspect of the present invention, a display method for displaying an image by a display apparatus including an image display panel configured to display sequentially, in units of lines, synthesized image signals in units of lines, the display method includes: outputting at least a vertical synchronization signal to a plurality of image-capturing apparatuses; synthesizing, in units of lines, image signals in units of lines output from the respective image-capturing apparatuses at a timing corresponding to a horizontal synchronization signal formed in a predetermined cycle based on an output timing of the vertical synchronization signal; and sequentially displaying, in units of lines, the synthesized image signals in units of lines.

BRIEF DESCRIPTION OF THE DRAWINGS

FIG. 8 is a diagram schematically illustrating a relation between units of display in the image display panel and units of data transfer of images output from image-capturing elements of three image-capturing apparatuses;

FIG. 20 is a timing chart of a relation between the output timings of the vertical synchronization signals and the horizontal synchronization signals and the output timings of the image signals in units of lines from the image-capturing apparatuses according to a fourth embodiment of the present invention;

FIG. 21 is a timing chart of a relation between the output timings of the vertical synchronization signals and the horizontal synchronization signals and the output timings of the image signals in units of lines from the image-capturing apparatuses according to a modification of the fourth embodiment; and FIG. 22 is a timing chart of a relation between the output timings of the vertical synchronization signals and the horizontal synchronization signals and the output timings of the image signals in units of lines from the image-capturing apparatuses according to another modification of the fourth embodiment.

DETAILED DESCRIPTION

Figure 1:
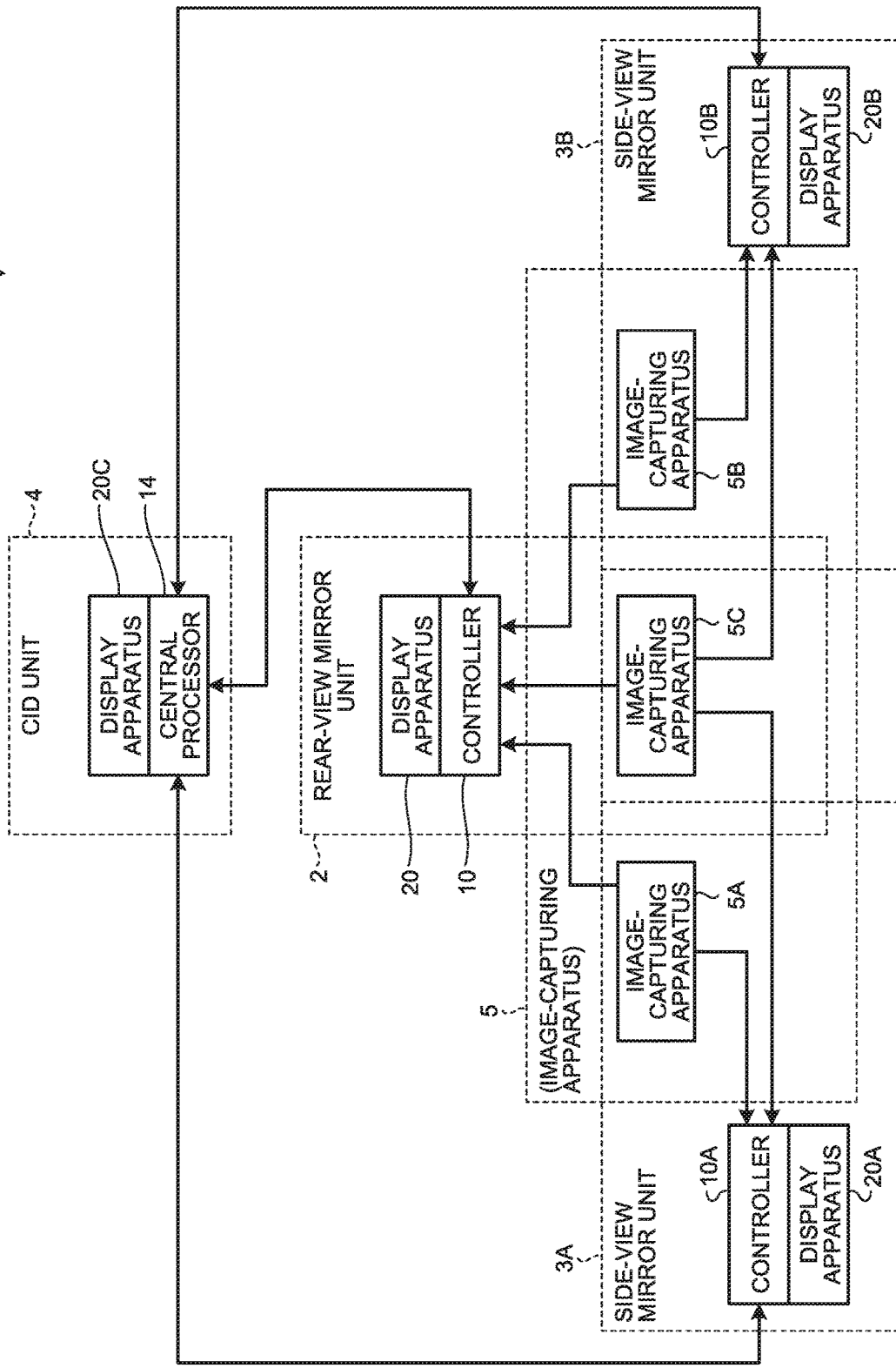
FIG. 1 is a diagram of a main configuration of a display system according to a first embodiment of the present invention.

Exemplary embodiments according to the present invention are described below with reference to the accompanying drawings. The disclosure is given as an example only, and various changes made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given as an example only and are not intended to limit interpretation of the invention. In the specification and the figures, components similar to those previously described with reference to preceding figures are denoted by the same reference numerals, and overlapping explanation thereof may be appropriately omitted.

First Embodiment

FIG. 1 is a diagram of a main configuration of a display system 1 according to a first embodiment of the present invention. As illustrated in FIG. 1, the display system 1 includes a rear-view mirror unit 2, two side-view mirror units 3A and 3B, and a center information display (CID) unit 4. The display system 1 is an on-board display system provided in a car serving as a movable body.

The rear-view mirror unit 2 and the side-view mirror units 3A and 3B each include an image-capturing apparatus 5, a display apparatus 20, and a controller 10, for example. The rear-view mirror unit 2 and the side-view mirror units 3A and 3B can each function as one processing unit (display system). In other words, controllers 10, 10A, and 10B of the rear-view mirror unit 2 and the side-view mirror units 3A and 3B perform image processing on an image displayed by respective display apparatuses 20, 20A, and 20B.

Figure 2:
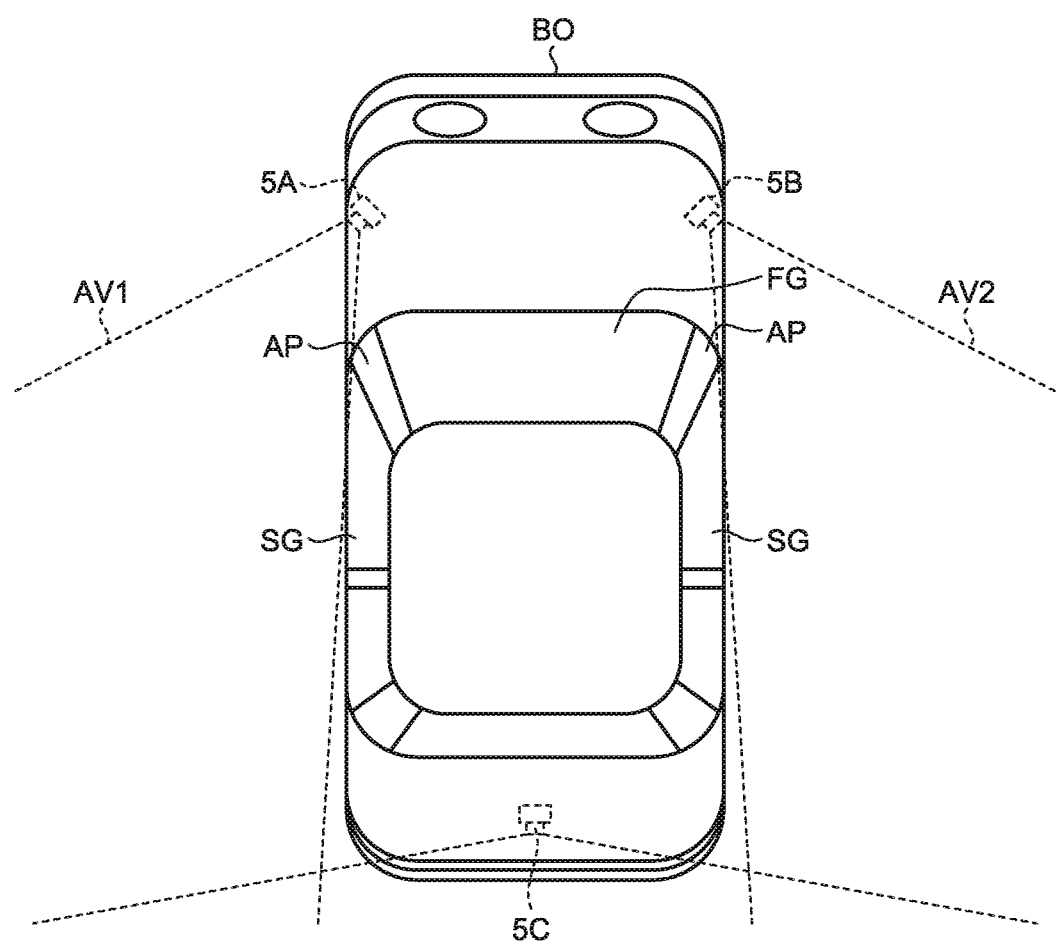
FIG. 2 is a schematic diagram of an exemplary arrangement of image-capturing apparatuses of a rear-view mirror unit and side-view mirror units.

FIG. 2 is a schematic diagram of an exemplary arrangement of image-capturing apparatuses 5A, 5B, and 5C of the rear-view mirror unit 2 and the side-view mirror units 3A and 3B. In FIG. 2, angles of view of the image-capturing apparatuses 5A, 5B, and 5C are indicated by the dashed lines. The rear-view mirror unit 2 and the side-view mirror units 3A and 3B according to the first embodiment share the image-capturing apparatuses 5. Specifically, as illustrated in FIG. 2, for example, the display system 1 according to the first embodiment includes three image-capturing apparatuses 5A, 5B, and 5C. The three image-capturing apparatuses 5A, 5B, and 5C are arranged on the rear part and both sides of a body BO of a car. Three image-capturing elements 72A, 72B, and 72C, which are respectively of the three image-capturing apparatuses 5A, 5B, and 5C, are each exposed outward through a lens 71 (refer to FIG. 9), and their angles of view extend toward the outside of the car. In other words, the three image-capturing apparatuses 5A, 5B, and 5C take images with which the conditions outside the car can be checked. More specifically, the angles of view of the image-capturing apparatuses 5A and 5B provided on corresponding sides and the angle of view of the image-capturing apparatus 5C provided on the rear part extend at least continuously, and preferably extend in a manner partially overlapping with each other. With this arrangement, the image-capturing areas of the three image-capturing apparatuses 5A, 5B, and 5C can cover the views behind angles of view AV1 and AV2 on the front side of the car out of the angles of view of the side image-capturing apparatuses 5A and 5B. The display apparatus 20 of the rear-view mirror unit 2 according to the first embodiment, for example, displays images taken by the three image-capturing apparatuses 5A, 5B, and 5C. The display apparatuses 20A and 20B of the side-view mirror units 3A and 3B, respectively, display an image obtained by synthesizing an image taken by the rear image-capturing apparatus 5C and an image taken by a corresponding one of the side image-capturing apparatuses 5A and 5B. This configuration is given as an example only, and the present invention is not limited thereto. The configuration may be appropriately changed. The image-capturing apparatuses 5A, 5B, and 5C may be hereinafter referred to as the image-capturing apparatus 5 when they need not particularly be distinguished from one another.

Figure 3:
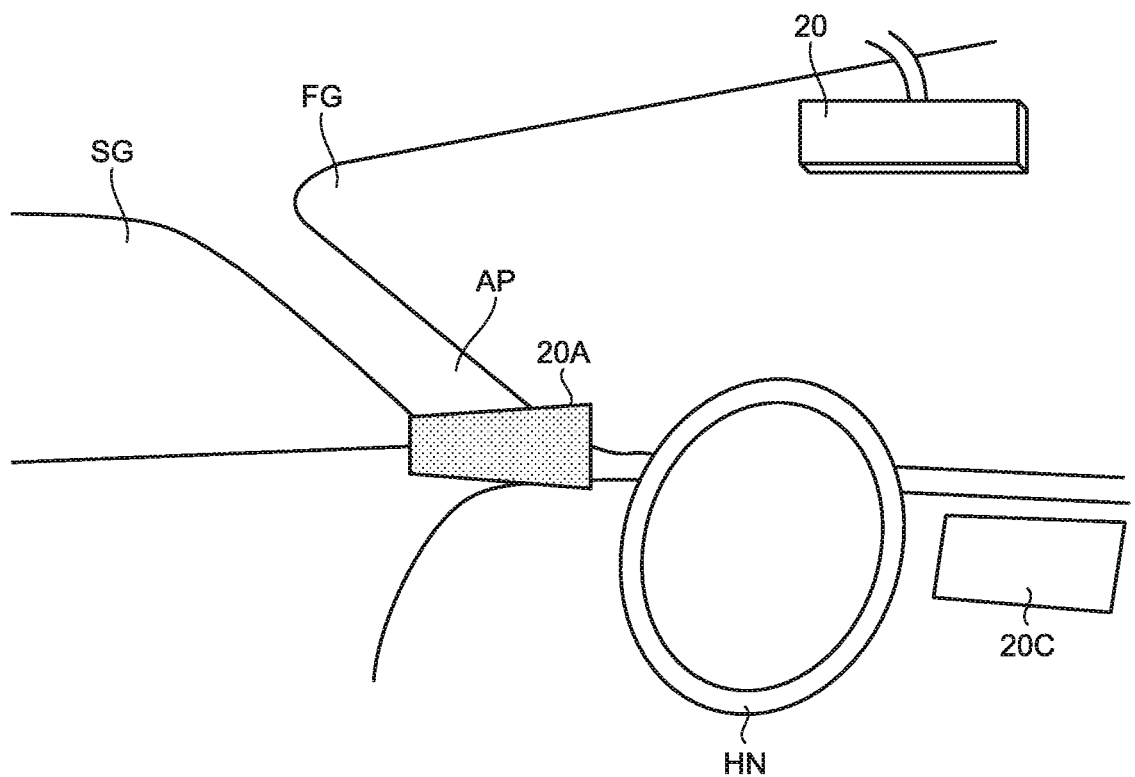
FIG. 3 is a schematic diagram of an exemplary arrangement of a display apparatus of the side-view mirror unit.

FIG. 3 is a schematic diagram of an exemplary arrangement of the display apparatus 20A of the side-view mirror unit 3A. The display apparatus 20A of the side-view mirror unit 3A is arranged on a side of a driver's seat in a four-wheeled car. Specifically, as illustrated in FIG. 3, for example, the display apparatus 20A of the side-view mirror unit 3A is provided near the root end of an A pillar AP present between a windshield FG and a side glass SG. The display apparatus 20B of the side-view mirror unit 3B is provided at a position on the opposite side of the display apparatus 20A of the side-view mirror unit 3A in the horizontal direction with respect to the driver's seat, provided with a steering wheel HN and the like. Each of the display apparatuses 20A and 20B of the side-view mirror units 3A and 3B mainly displays an image indicating the view of a side of the body BO out of the view outside the car. In other words, the side-view mirror units 3A and 3B can be used to check conditions outside the car on corresponding sides, which have conventionally been checked with door mirrors or fender mirrors. The display apparatus 20 of the rear-view mirror unit 2 is provided near the upper center of the windshield FG, for example, and substitutes for a rear-view mirror. In other words, the rear-view mirror unit 2 can be used to check the conditions outside the car in the rear-view direction, which have conventionally been checked with a rear-view mirror.

The CID unit 4 includes a central processor 14 and a display apparatus 20C, for example. The display apparatus 20C of the CID unit 4 is provided on a dashboard, for example, to serve as a display apparatus that displays navigational information and the like in a car navigation system. The display apparatus 20C of the CID unit 4 may be provided as a display apparatus that outputs information similar to that indicated by gauges, such as a speedometer, a tachometer, a fuel gauge, a water-temperature gauge, and an odometer.

The CID unit 4 according to the first embodiment is coupled to the rear-view mirror unit 2 and the side-view mirror units 3A and 3B in a manner capable of transmitting and receiving data bidirectionally. Specifically, the CID unit 4 is coupled to the rear-view mirror unit 2 and the side-view mirror units 3A and 3B via an interface, such as high-definition multimedia interface (HDMI, registered trademark). This coupling form is given just as an example of a specific form of coupling of the CID unit 4 to the rear-view mirror unit 2 and the side-view mirror units 3A and 3B. The present invention is not limited thereto, and the coupling form may be appropriately changed. If any one of the display apparatus 20 of the rear-view mirror unit 2, the display apparatus 20A of the side-view mirror unit 3A, and the display apparatus 20B of the side-view mirror unit 3B is broken down, the display apparatus 20C of the CID unit 4 displays and outputs data as a substitute for the broken display apparatus. The central processor 14 carries out various types of processing for display output performed by the display apparatus 20C of the CID unit 4.

Figure 4:
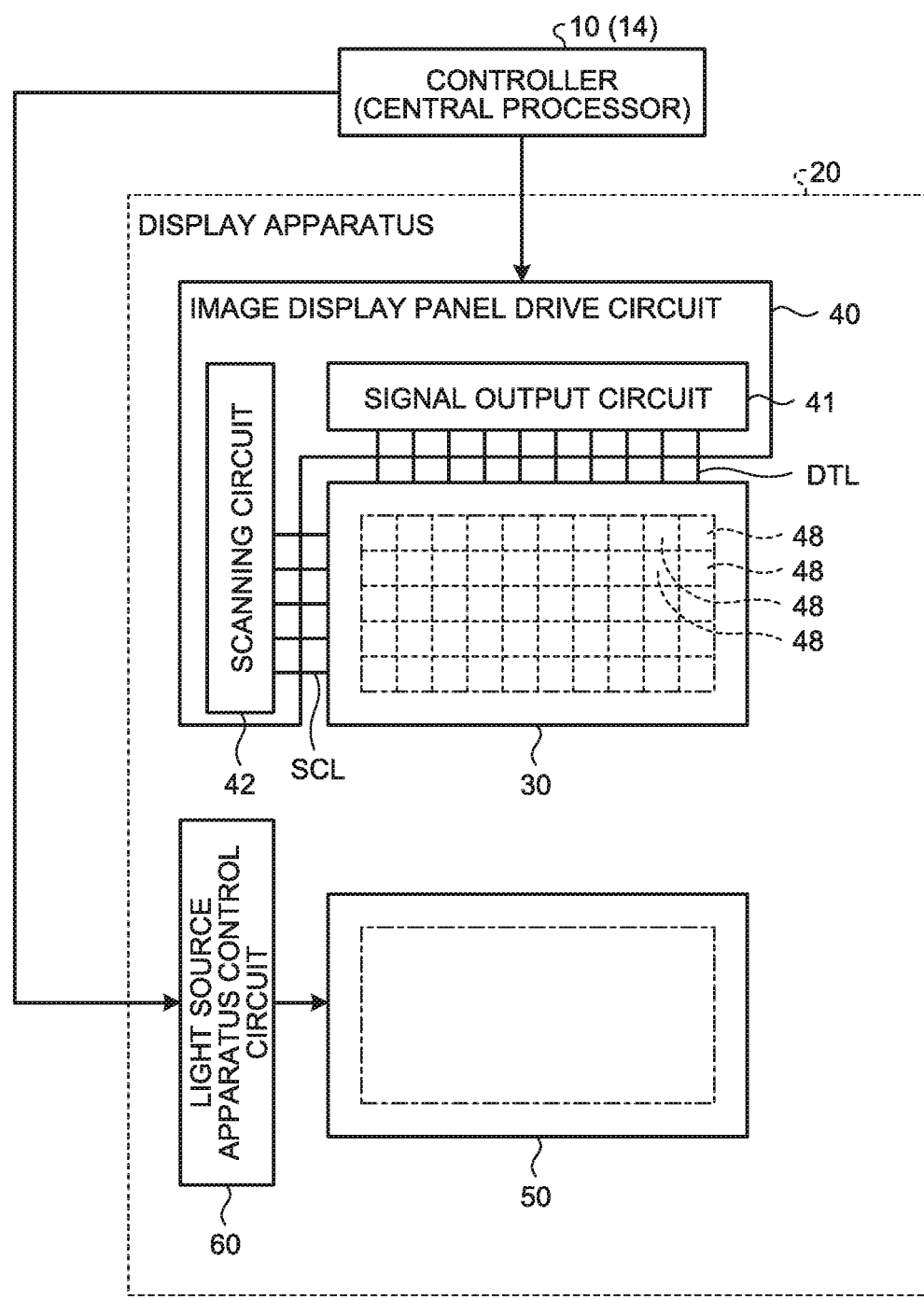
FIG. 4 is a block diagram of an exemplary configuration of the display apparatus.
Figure 5:
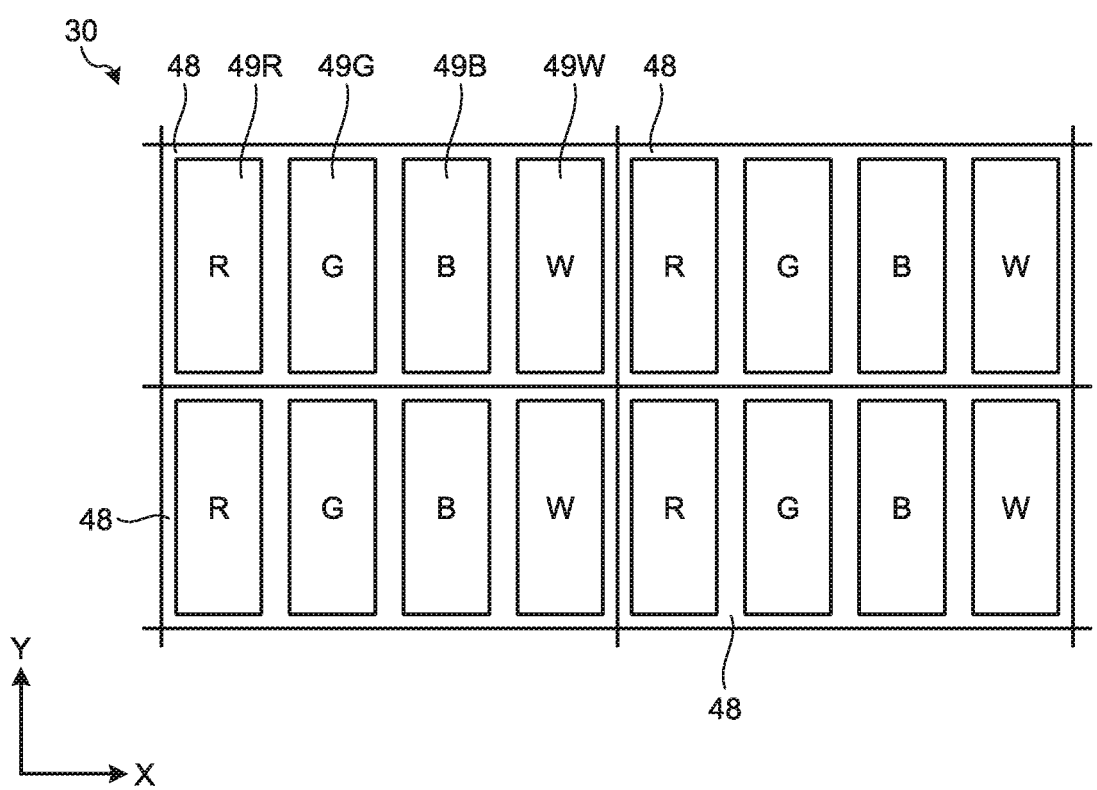
FIG. 5 is a diagram of a pixel array in an image display panel according to the first embodiment.
Figure 6:
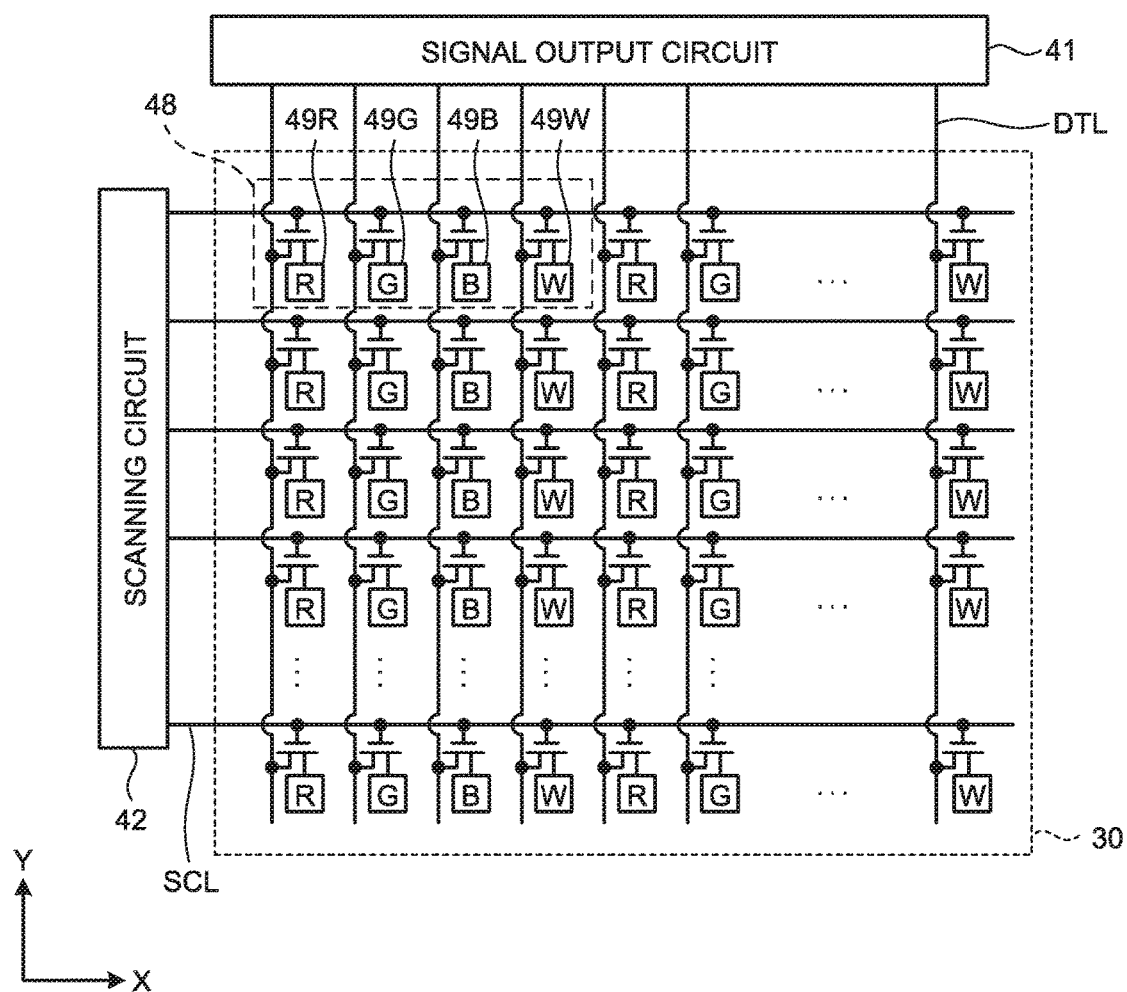
FIG. 6 is a conceptual diagram of the image display panel and an image display panel drive circuit of the display apparatus according to the first embodiment.
Figure 7:
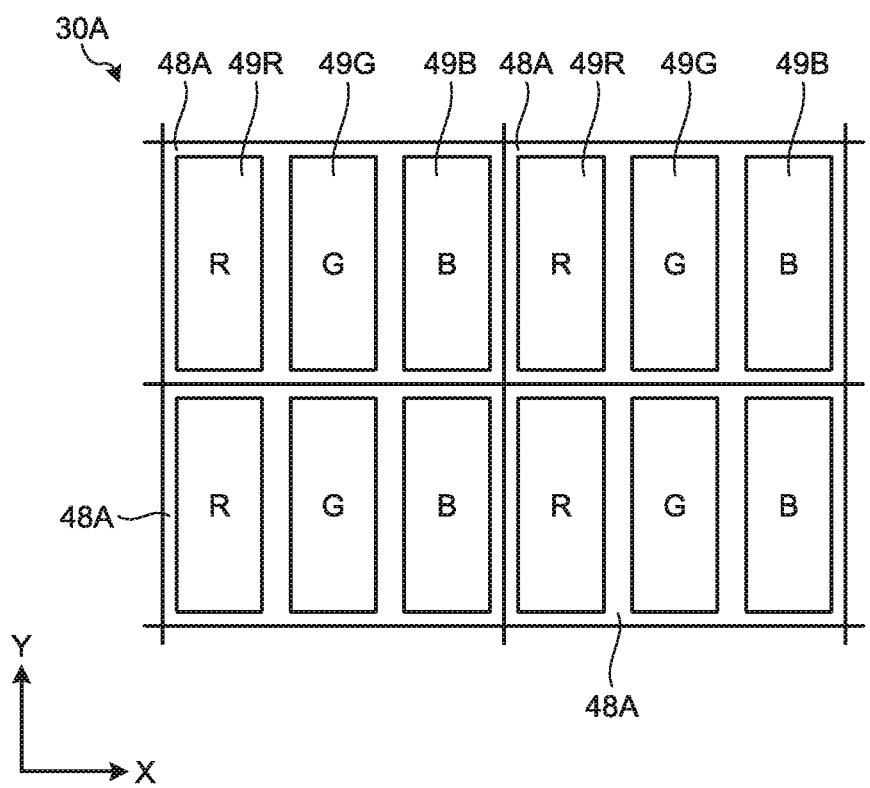
FIG. 7 is a diagram of another example of the pixel array in an image display panel according to the first embodiment.

FIG. 4 is a block diagram of an exemplary configuration of the display apparatus 20. FIG. 5 is a diagram of a pixel array in an image display panel according to the first embodiment. FIG. 6 is a conceptual diagram of the image display panel and an image display panel drive circuit of the display apparatus 20 according to the first embodiment. FIG. 7 is a diagram of another example of the pixel array in an image display panel according to the first embodiment. The configuration of the display apparatuses 20A and 20B of the side-view mirror units 3A and 3B and the configuration of the display apparatus 20C of the CID unit 4 according to the first embodiment are the same as that of the display apparatus 20 illustrated in FIGS. 4 to 7.

As illustrated in FIG. 4, the display apparatus 20 includes an image display panel 30, an image display panel drive circuit 40, a light source apparatus 50, and a light source apparatus control circuit 60. The image display panel 30 displays an image based on output signals output from the controller 10. The image display panel drive circuit 40 controls driving of the image display panel 30. The light source apparatus 50 illuminates the image display panel 30 from the back surface thereof, for example. The light source apparatus control circuit 60 controls the driving of the light source apparatus 50.

As illustrated in FIGS. 5 and 6, the image display panel 30 includes P×Q pixels 48 (P in the row direction and Q in the column direction) arrayed in a two-dimensional matrix. In the example illustrated in FIGS. 5 and 6, the pixels 48 are arrayed in a matrix in a two-dimensional X-Y coordinate system. In this example, the row direction corresponds to an X-direction, and the column direction corresponds to a Y-direction. Horizontal synchronization signals relate to scanning in the row direction. Vertical synchronization signals relate to scanning in the column direction.

The pixels 48 each include a first sub-pixel 49R, a second sub-pixel 49G, a third sub-pixel 49B, and a fourth sub-pixel 49W. The first sub-pixel 49R displays a first color component (e.g., red serving as a first primary color). The second sub-pixel 49G displays a second color component (e.g., green serving as a second primary color). The third sub-pixel 49B displays a third color component (e.g., blue serving as a third primary color). The fourth sub-pixel 49W displays a fourth color component (specifically, white). The first sub-pixel 49R, the second sub-pixel 49G, the third sub-pixel 49B, and the fourth sub-pixel 49W are hereinafter referred to as a sub-pixel 49 when they need not be distinguished from one another.

Specifically, the display apparatus 20 is a transmissive color liquid crystal display apparatus, for example. The image display panel 30 is a color liquid crystal display panel and includes first color filters, second color filters, and third color filters. The first color filters are arranged between the corresponding first sub-pixels 49R and an image observer and allow the first primary color to pass through. The second color filters are arranged between the corresponding second sub-pixels 49G and the image observer and allow the second primary color to pass through. The third color filters are arranged between the corresponding third sub-pixels 49B and the image observer and allow the third primary color to pass through. The image display panel 30 includes no color filter between the fourth sub-pixels 49W and the image observer. The fourth sub-pixels 49W may be each provided with a transparent resin layer instead of a color filter. With the transparent resin layers, the image display panel 30 can prevent the occurrence of a large gap above the fourth sub-pixels 49W, otherwise a large gap occurs because no color filter is arranged for the fourth sub-pixels 49W.

The image display panel 30 in the example illustrated in FIG. 5 has the first sub-pixels 49R, the second sub-pixels 49G, the third sub-pixels 49B, and the fourth sub-pixels 49W arranged in a predetermined array (e.g., a stripe array). The structure and the arrangement of the first sub-pixel 49R, the second sub-pixel 49G, the third sub-pixel 49B, and the fourth sub-pixel 49W in one pixel 48 are not particularly restricted. The image display panel 30 may have the first sub-pixels 49R, the second sub-pixels 49G, the third sub-pixels 49B, and the fourth sub-pixels 49W arranged in an array similar to a diagonal array (mosaic array), for example. Alternatively, the image display panel 30 may have the first sub-pixels 49R, the second sub-pixels 49G, the third sub-pixels 49B, and the fourth sub-pixels 49W arranged in an array similar to a delta array (triangular array) or a rectangular array, for example. Like an image display panel 30A illustrated in FIG. 7, pixels 48A may each include the first sub-pixel 49R, the second sub-pixel 49G, and the third sub-pixel 49B and include no fourth sub-pixel 49W.

The image display panel drive circuit 40 includes a signal output circuit 41 and a scanning circuit 42. The signal output circuit 41 is a source driver and generates video signals for driving the pixels 48 based on image data (data of synthesized images generated in units of lines, in other words, synthesized image signals in units of lines which will be described later) output from the controller 10 (or the central processor 14). The image display panel drive circuit 40 holds the video signals in the signal output circuit 41 and sequentially outputs them to the image display panel 30, based on the horizontal synchronization signals. The signal output circuit 41 is electrically coupled to the image display panel 30 via wires DTL. The pixels 48 operate such that the sub-pixels 49 have light transmittance corresponding to the video signals. The scanning circuit 42 is a gate driver and outputs scanning signals corresponding to pixel rows indicated by image data output from the controller 10 (or the central processor 14) based on the vertical synchronization signals. Based on the output of the scanning signals from the scanning circuit 42, the image display panel drive circuit 40 controls turning on and off of switching elements (e.g., thin film transistors (TFT)) that control the operations of the sub-pixels (e.g., display luminance, specifically, light transmittance in this example) in the image display panel 30. The scanning circuit 42 is electrically coupled to the image display panel 30 via scanning lines SCL. Turning on and off the switching elements via the scanning lines SCL by the scanning circuit 42 means turning on and off the switching elements in units of pixel rows (lines) provided along the scanning lines SCL. As described above, the display apparatus 20 can control turning on and off of display output in units of lines.

The light source apparatus 50 is arranged on the back surface side of the image display panel 30. The light source apparatus 50 emits light to the image display panel 30, thereby serving as a backlight that illuminates the image display panel 30. The light source apparatus 50 may be a front light arranged on the front surface side of the image display panel 30. In a case where the image display panel 30 is a self-luminous display device, such as an organic light emitting diode (OLED) display device or a reflective liquid crystal display device that performs display by reflecting external light on a reflective layer (reflective electrodes), the light source apparatus 50 is not required.

The light source apparatus 50 emits light to the entire surface of the image display panel 30, thereby illuminating the image display panel 30. The light source apparatus control circuit 60 controls the illumination amount of light emitted from the light source apparatus 50, for example. Specifically, the light source apparatus control circuit 60 adjusts the duty ratio of the electric current, the voltage, or the signals supplied to the light source apparatus 50 based on light source apparatus control signals output from the controller 10. The light source apparatus control circuit 60 thus controls the illumination amount (intensity) of light emitted to the image display panel 30.

Figure 8:
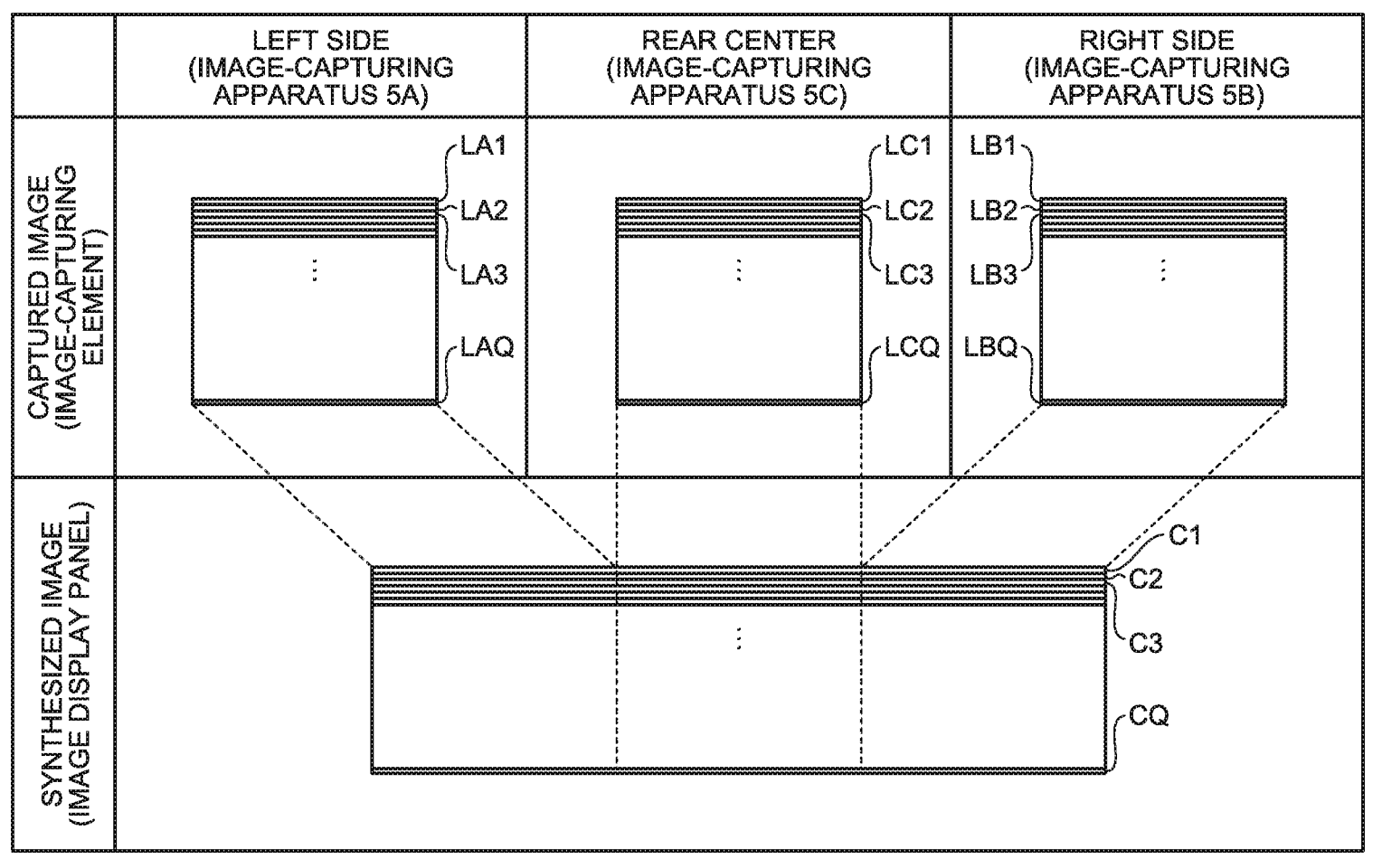

The following describes a relation between units of display in the image display panel 30 and units of data transfer of images taken by the image-capturing apparatuses 5A, 5B, and 5C. FIG. 8 is a diagram schematically illustrating the relation between units of display in the image display panel and units of data transfer of images output from the image-capturing elements 72A, 72B, and 72C of the three image-capturing apparatuses 5A, 5B, and 5C, respectively. The image-capturing apparatuses 5A, 5B, and 5C are digital cameras that take images using the image-capturing elements 72A, 72B, and 72C, such as charge coupled device (CCD) image sensors or complementary metal oxide semiconductor (CMOS) image sensors. The image-capturing elements 72A, 72B, and 72C output image signals in units of lines. The image display panel 30 displays an image in units of lines. A line corresponds to one pixel row (P×1) in the image display panel 30. In other words, the image-capturing elements 72A, 72B, and 72C sequentially output image data of one frame, which includes a plurality of lines, row by row as image signals in units of lines. The image display panel 30 displays, in units of lines, synthesized images generated in units of lines based on the image signals sequentially output in units of lines from the image-capturing elements 72A, 72B, and 72C of the respective image-capturing apparatuses 5A, 5B, and 5C. The synthesized images in units of lines are obtained by synthesizing images indicated by image signals sequentially output in units of lines from image-capturing elements (e.g., the image-capturing elements 72A, 72B, and 72C) of a plurality of image-capturing apparatuses (e.g., the three image-capturing apparatuses 5A, 5B, and 5C) such that the images are connected in the row direction. In the image display panel 30 according to the first embodiment, the number of pixels in the column direction is Q. In FIG. 8, LA1 to LAQ, LB1 to LBQ, and LC1 to LCQ denote the images in units of lines output from the image-capturing elements 72A, 72B, and 72C, respectively. In FIG. 8, C1 to CQ denote the synthesized images in units of lines displayed by the image display panel 30.

The numbers of pixels in the row direction indicated by the image signals individually output from the respective image-capturing elements 72A, 72B, and 72C of the three image-capturing apparatuses 5A, 5B, and 5C may be equal to or different from one another.

As illustrated in FIG. 8, the number of pixels (P) in the row direction in the image display panel 30 according to the first embodiment is equal to the number of pixels in the row direction obtained by connecting the image signals in units of lines output from the image-capturing elements 72A, 72B, and 72C of the three image-capturing apparatuses 5A, 5B, and 5C, in the row direction. In other words, in the first embodiment, a signal of synthesized images (synthesized image signal in units of lines) with pixels corresponding to the number of pixels in the row direction in the image display panel 30 can be obtained simply by connecting the image signals in units of lines output from the image-capturing elements 72A, 72B, and 72C of the three image-capturing apparatuses 5A, 5B, and 5C, respectively, in the row direction. The number of lines of the image-capturing elements 72A, 72B, and 72C according to the first embodiment is equal to the number of lines of the image display panel 30.

An image of one frame is composed of images of a plurality of lines. The image-capturing elements 72A, 72B, and 72C start image-capturing according to the vertical synchronization signal (vsync) and sequentially output image signals in units of lines according to a cycle of clocks formed by the horizontal synchronization signals (hsync). If output of all the image signals in units of lines constituting an image of one frame is completed, the image-capturing elements 72A, 72B, and 72C start image-capturing for an image of the next frame according to the next vertical synchronization signal. The display apparatus 20 starts scanning for display according to the vertical synchronization signal and sequentially displays synthesized images in units of lines, according to the horizontal synchronization signals. If display of all the synthesized images in units of lines constituting an image of one frame is completed, the display apparatus 20 starts to display synthesized images in units of lines constituting an image of the next frame based on the next vertical synchronization signal.

In the description below, a time for displaying all the synthesized images in units of lines constituting an image of one frame (1F) may be referred to as a one frame time (1F time). A time for displaying one synthesized image in units of lines may be referred to as a one horizontal synchronization time (1H time).

The following describes the display system according to the first embodiment with reference to the rear-view mirror unit 2 as an example.

Figure 9:
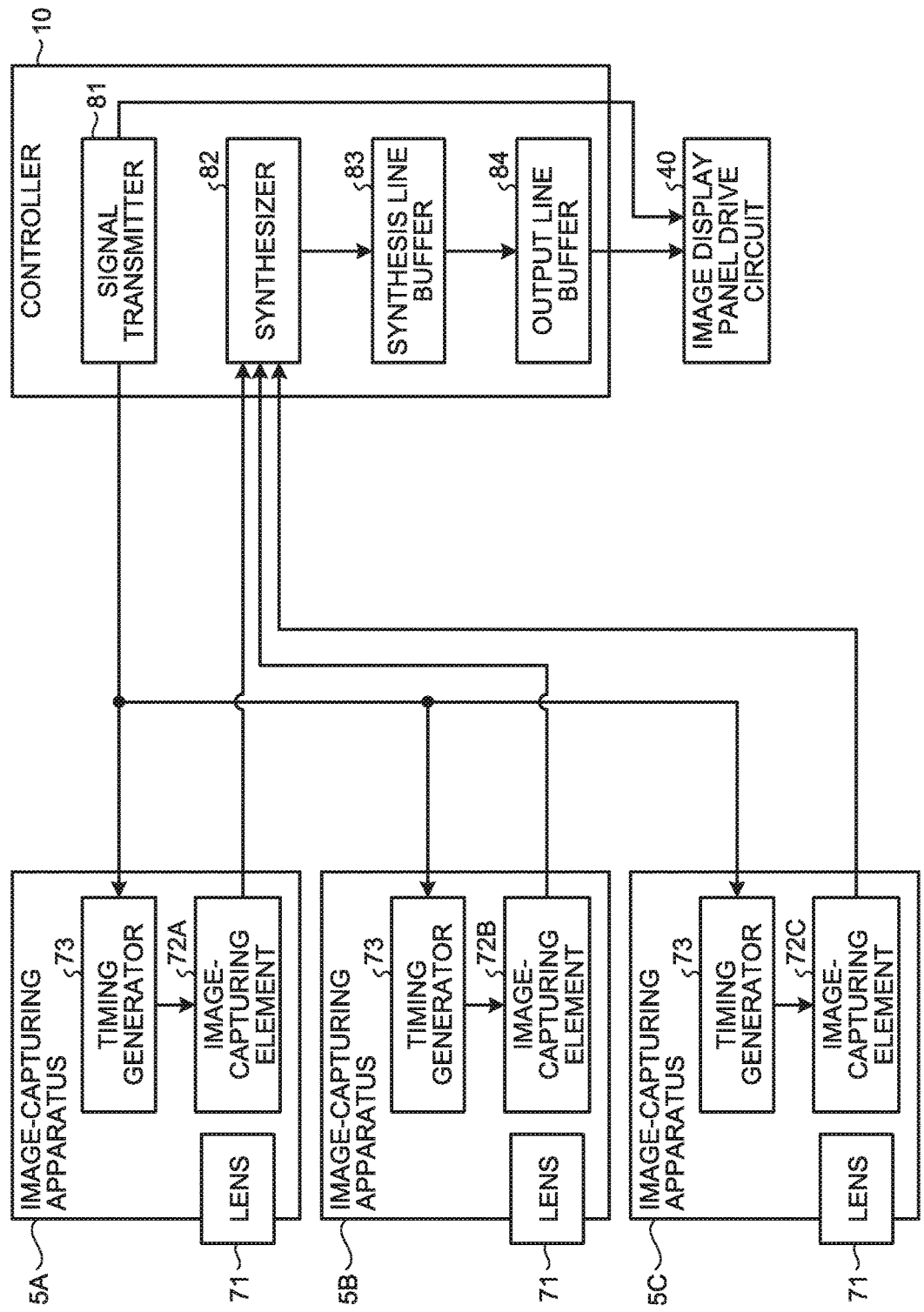
FIG. 9 is a diagram schematically illustrating a relation between a controller coupled to the display apparatus of the rear-view mirror unit and the image-capturing apparatuses according to the first embodiment.
Figure 10:
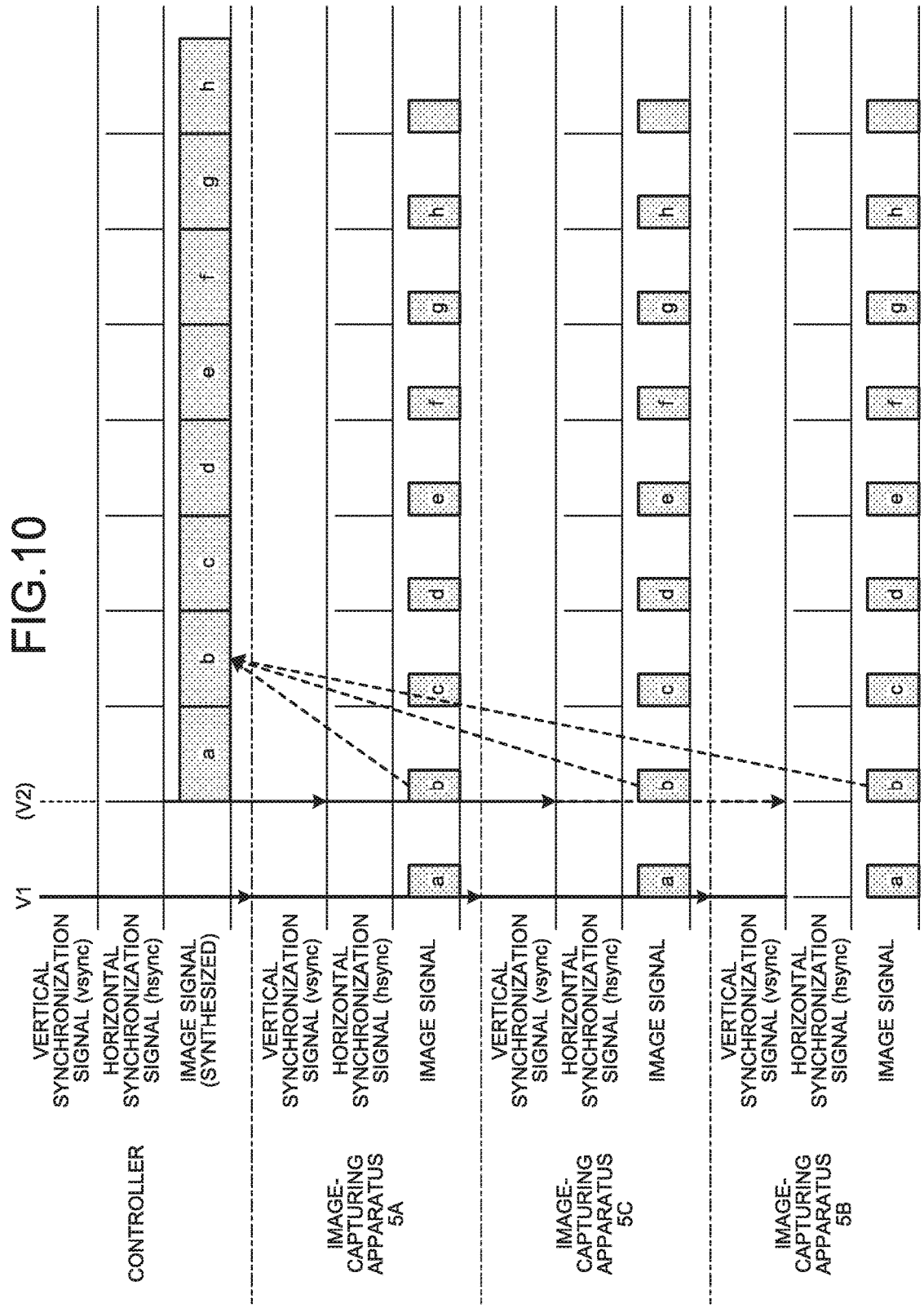
FIG. 10 is a timing chart of a relation between output timings of vertical synchronization signals and horizontal synchronization signals and output timings of image signals in units of lines from the image-capturing apparatuses according to the first embodiment.

FIG. 9 is a diagram schematically illustrating a relation between the controller 10 coupled to the display apparatus of the rear-view mirror unit 2 and the image-capturing apparatuses 5 according to the first embodiment. FIG. 10 is a timing chart of a relation between output timings of the vertical synchronization signals and the horizontal synchronization signals and output timings of the image signals in units of lines from the image-capturing apparatuses 5 according to the first embodiment. As illustrated in FIG. 9, the controller 10 is provided in data transmission paths between the image-capturing apparatuses 5 and the image display panel drive circuit 40. The controller 10 is a circuit that performs various types of processing relating to the operations of the rear-view mirror unit 2. The controller 10 includes a signal transmitter 81 and a synthesizer 82. The signal transmitter 81 according to the first embodiment outputs the vertical synchronization signals and the horizontal synchronization signals to the image-capturing apparatuses 5. Specifically, as illustrated in FIGS. 9 and 10, for example, the signal transmitter 81 outputs the vertical synchronization signals and the horizontal synchronization signals to the three image-capturing apparatuses 5A, 5B, and 5C. More specifically, the signal transmitter 81 outputs the vertical synchronization signal first. After 1H has elapsed, the signal transmitter 81 sequentially outputs the horizontal synchronization signals at intervals of 1H. As described above, the horizontal synchronization signals are formed in a predetermined cycle (at intervals of 1H) based on the output timing of the vertical synchronization signal. The vertical synchronization signals and the horizontal synchronization signals are also output to the image display panel drive circuit 40 from the signal transmitter 81 to serve as vertical synchronization signals and horizontal synchronization signals for display on the image display panel 30, that is, scanning signals. The controller 10 may separately output a display control vertical synchronization signal indicating a period when the image display panel 30 starts to output an image of one frame in scanning. The display control vertical synchronization signal is output at a timing after the 1H time has elapsed since the output timing of the vertical synchronization signal to the image-capturing apparatuses 5. In FIG. 10 and other figures, the display control vertical synchronization signal is indicated by the dashed line with V2. In FIG. 10 and other figures, the vertical synchronization signal output to the image-capturing apparatuses 5 is indicated by the solid line with V1.

The three image-capturing apparatuses 5A, 5B, and 5C, at a start timing, start to sequentially output the image signals in units of lines, the start timing corresponding to a timing when the vertical synchronization signal is received from the controller 10. Specifically, the three image-capturing apparatuses 5A, 5B, and 5C use the input timing of the vertical synchronization signal as a trigger to output, to the controller 10, image signals in units of lines corresponding to the first line of the image-capturing elements 72A, 72B, and 72C, respectively. At the input timings of the horizontal synchronization signals sequentially received after 1H has elapsed since the first input timing of the vertical synchronization signal, the three image-capturing apparatuses 5A, 5B, and 5C sequentially output, to the controller 10, image signals in units of lines corresponding to the second line and the lines subsequent thereto of the image-capturing elements 72A, 72B, and 72C. In other words, the output timings of the image signals in units of lines from the three image-capturing apparatuses 5A, 5B, and 5C synchronize with the input timings of the vertical synchronization signal and the horizontal synchronization signals from the controller 10. The image-capturing elements 72A, 72B, and 72C each including pixels arranged in a matrix in the image-capturing apparatuses 5 are exposed, for example. After the exposure, electrical signals are read from the image-capturing elements and output as image-capturing signals based on signals (e.g., output signals from timing generators 73) synchronized with the vertical synchronization signal from the controller 10. FIG. 10 illustrates the relation between the output timings and the input timings of only one vertical synchronization signal and horizontal synchronization signals output from the controller 10 to the three image-capturing apparatuses 5A, 5B, and 5C with the dashed arrows. The mechanism described above is also applicable to the vertical synchronization signals and the horizontal synchronization signals output at other timings.

More specifically, as illustrated in FIG. 9, for example, each of the image-capturing apparatuses 5 includes the timing generator 73 that operates a corresponding one of the image-capturing elements 72A, 72B, and 72C synchronously with the input timings of the vertical synchronization signals and the horizontal synchronization signals from the controller 10. The timing generator 73, for example, is a clock signal generation circuit that operates the image-capturing elements 72A, 72B, and 72C at the input timings of the vertical synchronization signals and the horizontal synchronization signals from the controller 10 to adjust the output cycle of the image signals in units of lines to the input cycle of the vertical synchronization signals and the horizontal synchronization signals from the controller 10.

The synthesizer 82 is configured to provide synthesized image signals in units of lines obtained by synthesizing, in units of lines, the image signals in units of lines output from the image-capturing apparatuses 5 at timings corresponding to the vertical synchronization signals and the horizontal synchronization signals. Specifically, as illustrated in FIG. 9, for example, the controller 10 includes a synthesis line buffer 83 and an output line buffer 84. The synthesis line buffer 83 temporarily stores synthesized image signals in units of lines obtained by synthesizing image signals in units of lines output from the three image-capturing apparatuses 5A, 5B, and 5C such that the image signals are connected in the row direction. The synthesizer 82 synthesizes the signals output from the three image-capturing apparatuses 5A, 5B, and 5C to generate the synthesized image signals in units of lines and stores the synthesized image signals in the synthesis line buffer 83. The synthesizer 82 transfers the synthesized image signals in units of lines from the synthesis line buffer 83 to the output line buffer 84. The output line buffer 84 collectively outputs the transferred synthesized image signals in units of lines to the image display panel drive circuit 40. The synthesized image signals in units of lines output from the output line buffer 84 are displayed using the respective lines of the image display panel 30.

The processing timings of the synthesizer 82 synchronize with the output timings of the horizontal synchronization signals. In other words, the synthesizer 82 synthesizes, in a cycle of 1H, the image signals in units of lines received in a cycle of 1H synchronously with the horizontal synchronization signals to generate the synthesized image signals in units of lines. The synthesizer 82 transfers the synthesized image signals in units of lines from the synthesis line buffer 83 to the output line buffer 84 in a cycle of 1H. The synthesizer 82 collectively outputs the synthesized image signals in units of lines from the output line buffer 84 to the image display panel drive circuit 40 in a cycle of 1H. In FIG. 10, lowercase letters of the alphabet indicate the correspondence relation between the image signals in units of lines output from the image-capturing apparatuses 5A, 5B, and 5C and the synthesized image signals in units of lines synthesized by the synthesizer 82. As illustrated in FIG. 10, the synthesizer 82 according to the first embodiment acquires and synthesizes the image signals in units of lines at a timing after the 1H time has elapsed since the output timing. FIG. 10 illustrates the relation between the output timing and the synthesis timing of only the image signals denoted by the lowercase letter b with the dashed arrows. The mechanism described above is also applicable to the image signals output at other timings.

The image display panel 30 sequentially displays, in units of lines, the image signals in units of lines output from the output line buffer 84. The cycle in which the image display panel 30 sequentially outputs the image signals in units of lines synchronizes with the horizontal synchronization signals.

As described above, the rear-view mirror unit 2 serves as a display system including the controller 10 and the image display panel 30. The controller 10 includes the signal transmitter 81 and the synthesizer 82. The signal transmitter 81 outputs the vertical synchronization signals and the horizontal synchronization signals to the image-capturing apparatuses 5. The synthesizer 82 synthesizes, in units of lines, the image signals in units of lines output from the respective image-capturing apparatuses 5 at timings corresponding to the vertical synchronization signals and the horizontal synchronization signals. The image display panel 30 sequentially displays, in units of lines, the synthesized image signals in units of lines synthesized by the synthesizer 82. The image-capturing apparatuses 5 (e.g., the three image-capturing apparatuses 5A, 5B, and 5C) output, in units of lines, the taken images.

The start timing of output of the image signals in units of lines by the image-capturing apparatuses 5 depends on the vertical synchronization signal output from the signal transmitter 81 of the controller 10 according to the first embodiment. As described above, the vertical synchronization signal according to the first embodiment serves as a start signal for ordering start of output of the image signals in units of lines.

While the explanation has been made of the first embodiment using the rear-view mirror unit 2 as an example, the side-view mirror units 3A and 3B operate similarly to the rear-view mirror unit 2. Specifically, the controllers 10A and 10B are the same as the controller 10. In other words, the component that displays the images based on the image-capturing apparatuses according to the present embodiment is not limited to the display apparatus 20 of the rear-view mirror unit 2. The component may be the display apparatus 20A of the side-view mirror unit 3A, the display apparatus 20B of the side-view mirror unit 3B, or the display apparatus 20C of the CID unit 4. In the first embodiment, the rear-view mirror unit 2 displays images taken by the three image-capturing apparatuses 5A, 5B, and 5C, and the side-view mirror units 3A and 3B each display images taken by corresponding image-capturing apparatuses 5. The side-view mirror unit 3A, for example, displays images taken by the image-capturing apparatuses 5A and 5C. The side-view mirror unit 3B displays images taken by the image-capturing apparatuses 5B and 5C.

The signal transmitter 81 of the controller 10 in any one of the rear-view mirror unit 2, the side-view mirror unit 3A, and the side-view mirror unit 3B simply needs to function. In the configuration according to the first embodiment, the signal transmitter 81 of the controller 10 in the rear-view mirror unit 2 functions, for example. The synthesizers 82 and the image display panels 30 of the side-view mirror units 3A and 3B operate synchronously with the vertical synchronization signals and the horizontal synchronization signals output from the signal transmitter 81. In a case where the display system operates synchronously under the control of the signal transmitter 81 of the controller 10 in any one of the rear-view mirror unit 2, the side-view mirror unit 3A, and the side-view mirror unit 3B, the vertical synchronization signals and the horizontal synchronization signals from the signal transmitter 81 of the controller 10 may also be output to the other controllers 10.

The storage capacity of the synthesis line buffer 83 and the output line buffer 84 simply needs to be equal to or larger than the storage capacity required to store the synthesized images in units of lines. Alternatively, the storage capacity of the synthesis line buffer 83 and the output line buffer 84 may be smaller than the storage capacity required to store all the synthesized images in units of lines. Consequently, the storage capacity of the line buffers would be smaller than the storage capacity required to store the entire display screen image (frame image).

The image-capturing elements 72A, 72B, and 72C of the respective image-capturing apparatuses 5A, 5B, and 5C operate according to the vertical synchronization signals and the horizontal synchronization signals independently of the vertical synchronization signals and the horizontal synchronization signals output from the controller 10. In other words, the vertical synchronization signals output from the controller 10 are used only to control the output timings of the image signals in units of lines output from the three image-capturing apparatuses 5A, 5B, and 5C. The vertical synchronization signals are not used directly to control the operations of the image-capturing elements 72A, 72B, and 72C. The phases of the vertical synchronization signals and the horizontal synchronization signals in the image-capturing apparatuses 5 are not necessarily synchronized with those of the vertical synchronization signals and the horizontal synchronization signals in the controller 10. Specifically, output of the image signals in units of lines from the image-capturing apparatuses 5 simply needs to catch up with but not overtake the output cycle of the horizontal synchronization signals output from the controller 10.

According to the first embodiment, it is possible to display the images taken by the image-capturing apparatuses 5 in units of lines on the image display panel 30. This can reduce the time difference between the timings for image-capturing of the images by the image-capturing apparatuses 5 and the timings for displaying the images by the image display panel 30 to a time in units of lines (e.g., the 1H time) shorter than the 1F time. Consequently, it is possible to reduce a delay time from when images are taken by the image-capturing apparatuses 5 to when synthesized images obtained by synthesizing the images taken by the image-capturing apparatuses 5 are displayed. Also it is possible to improve the real-time property when the images taken by the image-capturing apparatuses 5 are synthesized and displayed.

Modifications

The following describes modifications of the first embodiment. In the description of the modifications, components similar to those according to the first embodiment are denoted by the same reference numerals, and explanation thereof may be omitted.

Figure 11:
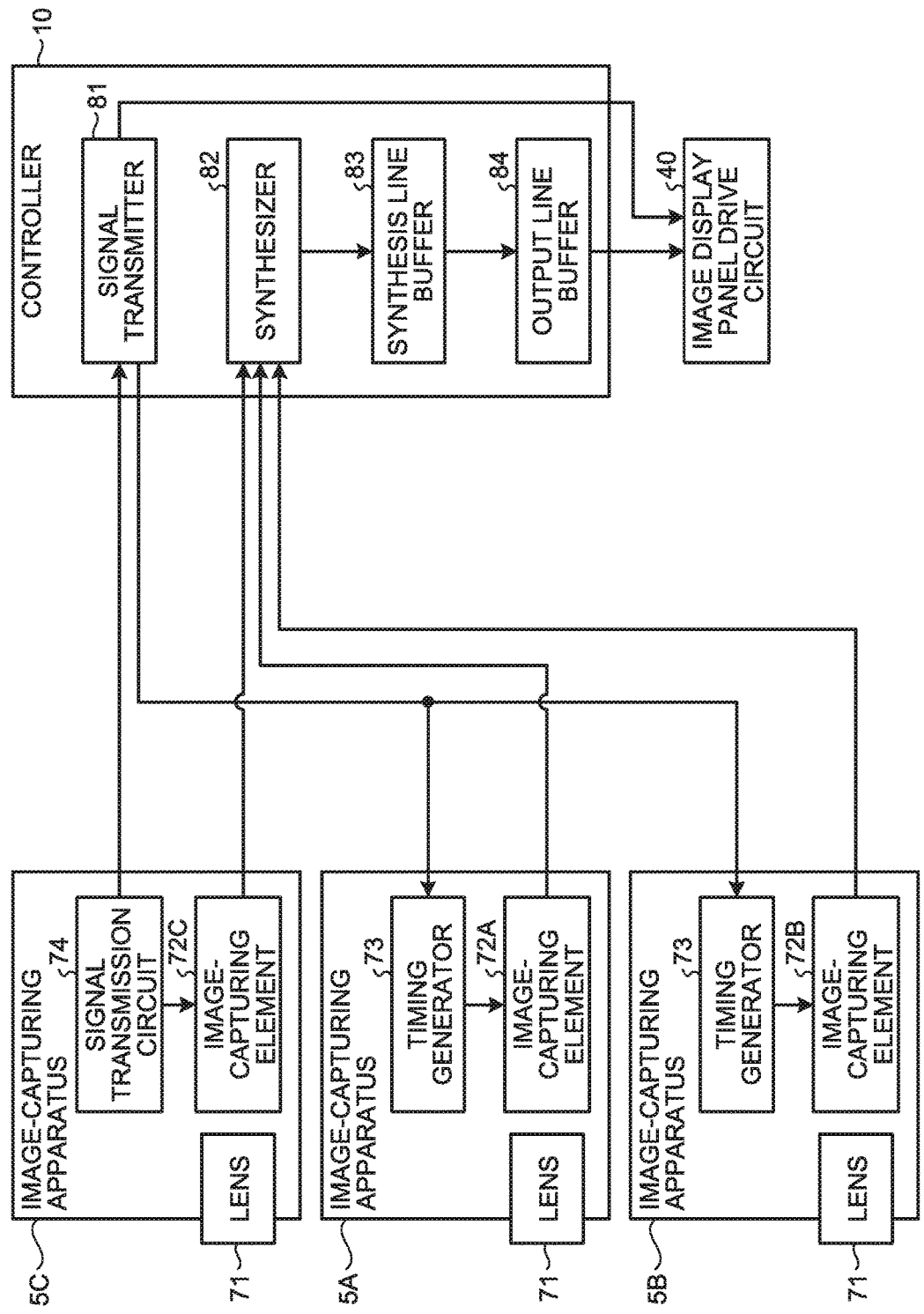
FIG. 11 is a diagram schematically illustrating a relation between the controller coupled to the display apparatus of the rear-view mirror unit and the image-capturing apparatuses according to a modification.
Figure 12:
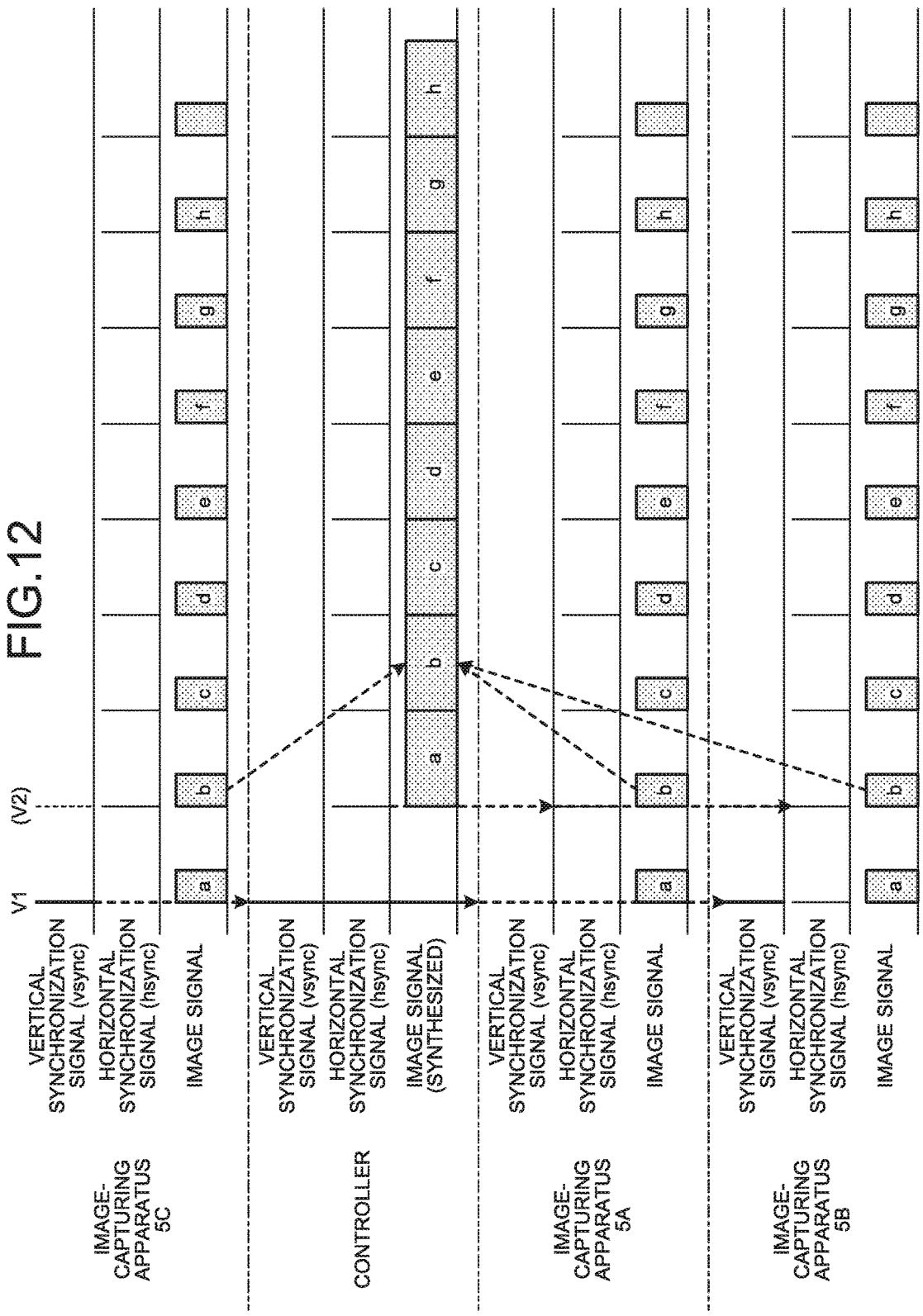
FIG. 12 is a timing chart of a relation between the output timings of the vertical synchronization signals and the horizontal synchronization signals and the output timings of the image signals in units of lines from the image-capturing apparatuses according to the modification.

FIG. 11 is a diagram schematically illustrating a relation between the controller 10 coupled to the display apparatus of the rear-view mirror unit 2 and the image-capturing apparatuses 5 according to a modification. FIG. 12 is a timing chart of a relation between the output timings of the vertical synchronization signals and the horizontal synchronization signals and the output timings of the image signals in units of lines from the image-capturing apparatuses 5 according to the modification. The signal transmitter 81 of the controller 10 according to the modification outputs the vertical synchronization signals and the horizontal synchronization signals in response to a start signal output from any one of the image-capturing apparatuses 5. Specifically, as illustrated in FIG. 12, for example, the image-capturing apparatus 5C outputs a start signal to the controller 10 synchronously with the output timing of the vertical synchronization signal from the image-capturing element 72C of the image-capturing apparatus 5C.

The controller 10 according to the modification operates synchronously with the operations of the image-capturing apparatus 5C based on the start signal. Specifically, as illustrated in FIG. 12, the signal transmitter 81 of the controller 10 outputs the vertical synchronization signal synchronously with the input timing of the start signal. The signal transmitter 81 outputs the horizontal synchronization signals at the same timings as those according to the first embodiment.

The image-capturing apparatus 5C according to the modification operates synchronously with the operations of the image display panel 30. Specifically, as illustrated in FIG. 11, for example, the image-capturing apparatus 5C according to the modification includes a signal transmission circuit 74 that outputs the start signal. The cycle of the vertical synchronization signals and the horizontal synchronization signals in the image-capturing element 72C of the image-capturing apparatus 5C according to the modification is the same as that of the vertical synchronization signals and the horizontal synchronization signals output from the signal transmitter 81 of the controller 10.

While the image-capturing apparatus 5C outputs the start signal in FIGS. 11 and 12, the other image-capturing apparatuses 5A and 5B may output the start signal.

The controller 10 according to the modification outputs the vertical synchronization signals and the horizontal synchronization signals to the image-capturing apparatuses (e.g., the image-capturing apparatuses 5A and 5B) other than the image-capturing apparatus (e.g., the image-capturing apparatus 5C) that outputs the start signal. The image-capturing apparatus (e.g., the image-capturing apparatus 5C) that outputs the start signal operates based on the vertical synchronization signals and the horizontal synchronization signals used for the operations of the image-capturing element (e.g., the image-capturing element 72C) of the image-capturing apparatus. The image-capturing apparatus outputs the image signals in units of lines to the controller 10 at the output timings of the synchronization signals. The operations of the image-capturing apparatuses (e.g., the image-capturing apparatuses 5A and 5B) other than the image-capturing apparatus (e.g., the image-capturing apparatus 5C) that outputs the start signal and the operations of the synthesizer 82 of the controller 10 are the same as those according to the first embodiment.

According to the modification, components in the display system can operate based on the operation timings of any one of the image-capturing apparatuses 5.

The controller 10 may be configured to operate based on settings that indicate which of the controller 10 and any one of the image-capturing apparatuses 5 outputs the start signal. In other words, the controller 10 may be configured to be switched, by the settings, between a mode to operate on condition that the vertical synchronization signal output from the signal transmitter 81 is used as the start signal and a mode to operate on condition that the start signal is received from the image-capturing apparatus 5. The image-capturing apparatuses 5 may each include both of the signal transmission circuit 74 and the timing generator 73 and switch on and off the operations of the signal transmission circuit 74. In other words, in the configuration according to the first embodiment, the signal transmission circuits 74 of all the image-capturing apparatuses 5 are turned off. In the configuration according to the modification, the signal transmission circuit 74 of any one of the image-capturing apparatuses 5 is turned on.

Figure 13:
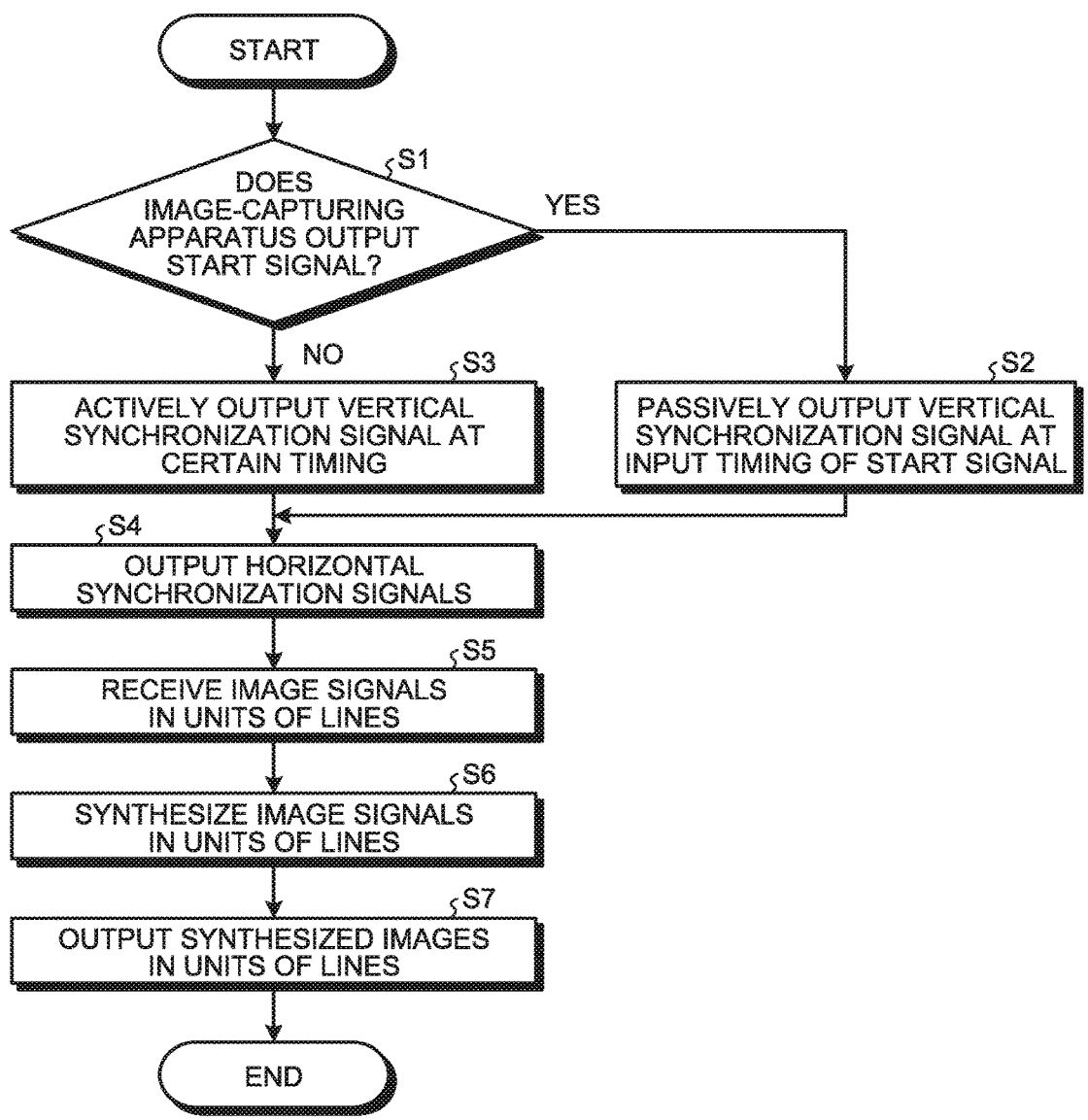
FIG. 13 is a flowchart of an example of processing performed by the controller according to the first embodiment and the modification.

FIG. 13 is a flowchart of an example of processing performed by the controller 10 according to the first embodiment and the modification. If any one of the image-capturing apparatuses 5 outputs a start signal (Yes at Step S1), the signal transmitter 81 of the controller 10 responsively outputs the vertical synchronization signal to the other image-capturing apparatuses 5 according to the input timing of the start signal (Step S2). If the image-capturing apparatuses 5 do not output a start signal (No at Step S1), the signal transmitter 81 of the controller 10 independently outputs the vertical synchronization signal to all the image-capturing apparatuses 5 at a certain timing (Step S3). The controller 10 outputs the horizontal synchronization signals to the image-capturing apparatuses 5 that do not output a start signal (Step S4).

The image-capturing apparatuses 5 output the image signals in units of lines to the controller 10 according to the output timings of the horizontal synchronization signals output from the controller 10, and the controller 10 receives the image signals in units of lines (Step S5). The synthesizer 82 of the controller 10 synthesizes the image signals in units of lines received from the image-capturing apparatuses 5 (Step S6). The synthesizer 82 outputs the synthesized image signals to the image display panel drive circuit 40 (Step S7). Consequently, the image display panel 30 displays, in units of lines, the synthesized images.

Second Embodiment

The following describes a second embodiment of the present invention. In the description of the second embodiment, components similar to those according to the first embodiment are denoted by the same reference numerals, and explanation thereof may be omitted.

Figure 14:
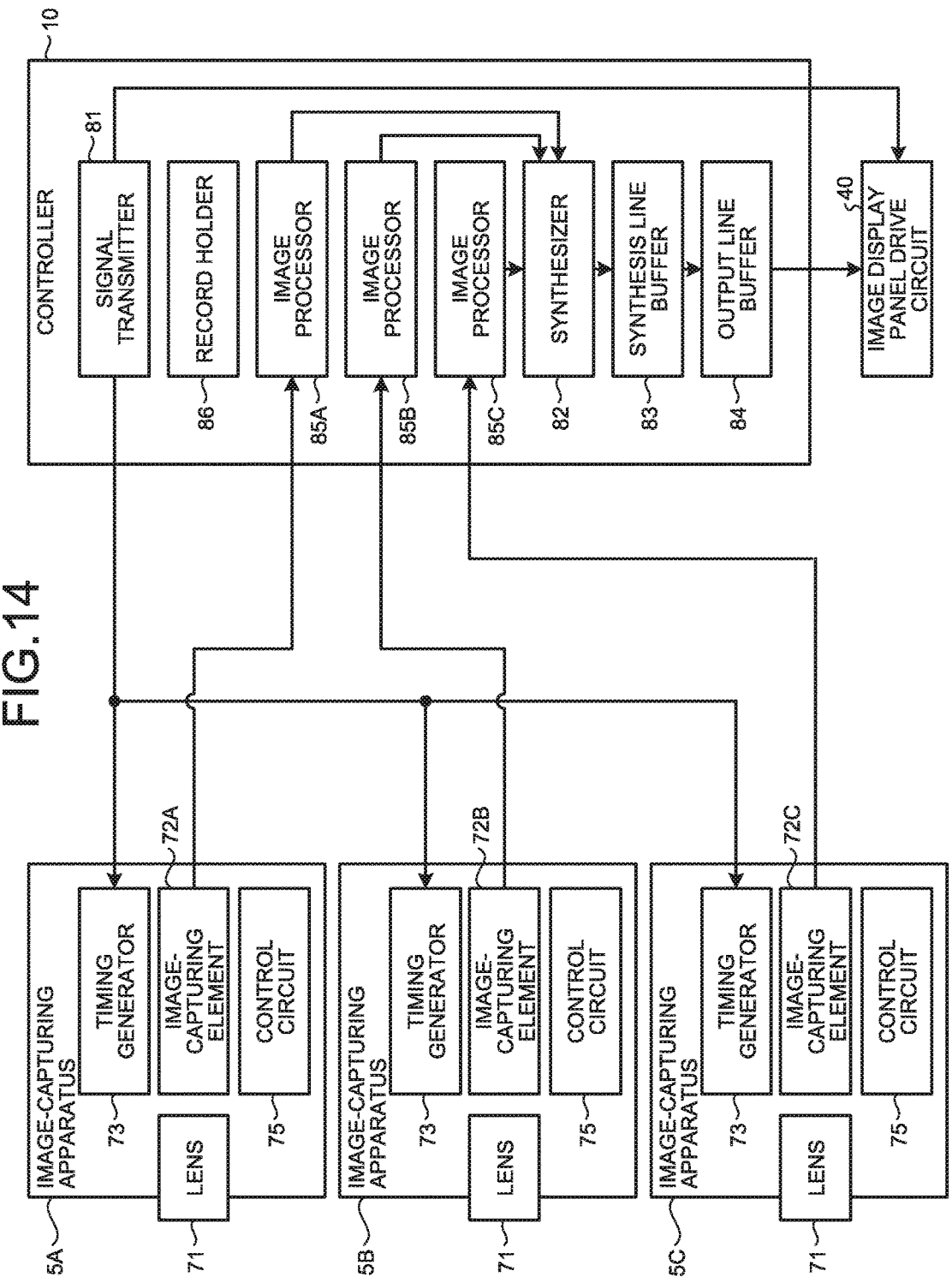
FIG. 14 is a diagram schematically illustrating a relation between the controller coupled to the display apparatus of the rear-view mirror unit and the image-capturing apparatuses according to a second embodiment.
Figure 15:
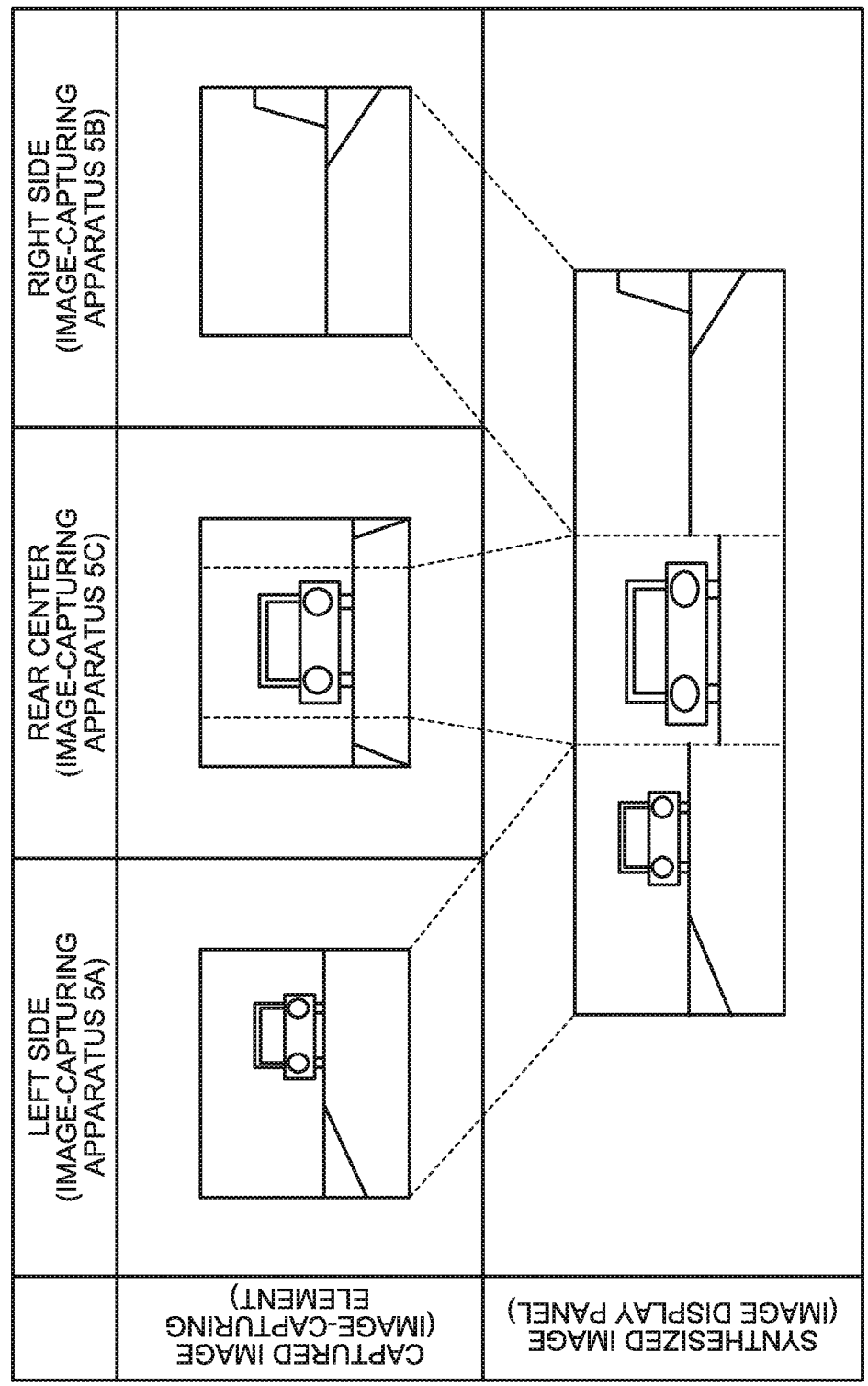
FIG. 15 is a diagram schematically illustrating an example of a correspondence relation between captured images taken by the image-capturing elements and a synthesized image displayed on the image display panel according to the second embodiment.

FIG. 14 is a diagram schematically illustrating a relation between the controller 10 coupled to the display apparatus of the rear-view mirror unit 2 and the image-capturing apparatuses 5 according to the second embodiment. FIG. 15 is a diagram schematically illustrating an example of a correspondence relation between captured images taken by the image-capturing elements 72A, 72B, and 72C and a synthesized image displayed on the image display panel 30 according to the second embodiment. The controller 10 according to the second embodiment includes image processors 85A, 85B, and 85C that perform image conversion processing including at least one of reduction and enlargement of an image in the row direction. In other words, the image conversion processing includes at least one of the expansion processing and contraction processing. Specifically, as illustrated in FIG. 14, for example, the controller 10 includes image processors (e.g., the three image processors 85A, 85B, and 85C) the number of which corresponds to that of the image-capturing apparatuses 5 (e.g., three). The image processors 85A, 85B, and 85C perform predetermined image processing in the row direction, such as reduction or enlargement, on the images in units of lines obtained from the image signals in units of lines output from the corresponding image-capturing apparatuses 5. As described above, the image processors 85A, 85B, and 85C according to the second embodiment can perform image conversion processing on the image signals in units of lines output from the corresponding image-capturing apparatuses 5 at respective ratios of image conversion processing. Alternatively, the display system of the second embodiment may simply output images in units of lines cut out from the image-capturing images of the image-capturing elements 72A, 72B, and 72C without performing the image conversion processing on part or all of the lines. While all the image processors 85A, 85B, and 85C enlarge the images in the row direction in the example illustrated in FIG. 15, one or more of them may perform reduction.

In the example illustrated in FIG. 15, the number of pixels (the number of columns) making up a line expressed by the image signals in units of lines output from the image-capturing element 72C of the image-capturing apparatus 5C are smaller than the number of pixels (the number of columns) making up each line of the image-capturing element 72C. The image-capturing apparatuses 5 may extract part of the captured images in the row direction and then output the image signals in units of lines.

The portion to be extracted from the captured image can be determined for each of the image-capturing apparatuses 5 in advance. Specifically, with the arrangement of the image-capturing apparatuses 5A, 5B, and 5C illustrated in FIG. 2, for example, the image-capturing area of the image-capturing apparatus 5C overlaps with the image-capturing areas of the image-capturing apparatuses 5A and 5B. To address this, as illustrated in FIG. 15, the display system of the second embodiment extracts images so as to exclude the portions including the same subject as the subject in the captured images taken by the image-capturing elements 72A and 72B of the image-capturing apparatuses 5A and 5B, which is caused by overlapping of the image-capturing areas, from the captured image taken by the image-capturing element 72C of the image-capturing apparatus 5C. Consequently, the display system of the second embodiment can prevent the same subject from being duplicated in the synthesized image.

FIG. 15 illustrates that, when a partial area is extracted from the captured image, the same portion in the row direction is extracted from all the lines. Alternatively, different portions in the row direction may be extracted from part or all of the lines. In the second embodiment, different portions may be extracted in the row direction in units of lines considering a case where the ratio of distortion differs in units of lines because of distortion in the image caused by image-capturing through the lens, for example. After the extraction, enlargement or reduction may be performed so as to make the width of the frame image in the row direction uniform. The extraction portions and the degree (ratio) of enlargement or reduction may be determined so as to eliminate the distortion.

As illustrated in FIG. 14, the image processors 85A, 85B, and 85C according to the second embodiment are provided before the synthesis line buffer 83. The image signals in units of lines are output from the image-capturing elements 72A, 72B, and 72C, which are respectively of the three image-capturing apparatuses 5A, 5B, and 5C, and received by the controller 10. The received image signals are subjected to enlargement or reduction by the image processors 85A, 85B, and 85C. Subsequently, the image signals are synthesized using the synthesis line buffer 83.

The number of pixels (P) in the row direction in the image display panel 30 according to the second embodiment is not necessarily equal to the number of pixels in the row direction obtained by connecting the image signals in units of lines output from the image-capturing elements 72A, 72B, and 72C, which are respectively of the three image-capturing apparatuses 5A, 5B, and 5C, in the row direction. Enlargement or reduction in the row direction makes the number of pixels in the row direction in the synthesized images in units of lines equal to the number of pixels (P) in the row direction in the image display panel 30. The method for resampling performed in enlargement or reduction may be freely determined and may be one or a plurality of various methods that can be employed for resampling of an image composed of a plurality of pixels at present or in the future.

According to the second embodiment, image conversion processing including at least one of reduction and enlargement of images in the row direction is performed, and then the images are displayed in units of lines. The image processors 85A, 85B, and 85C perform enlargement or reduction only in the row direction and do not perform image processing in the column direction. With this mechanism, it is not necessary to hold a frame image required to have enlargement or reduction performed in the column direction. Consequently, the controller 10 can perform image processing in units of lines without any waiting time for completing a frame image before the processing.

Third Embodiment

The following describes a third embodiment of the present invention. In the description of the third embodiment, components similar to those according to the first embodiment are denoted by the same reference numerals, and explanation thereof may be omitted.

Figure 16:
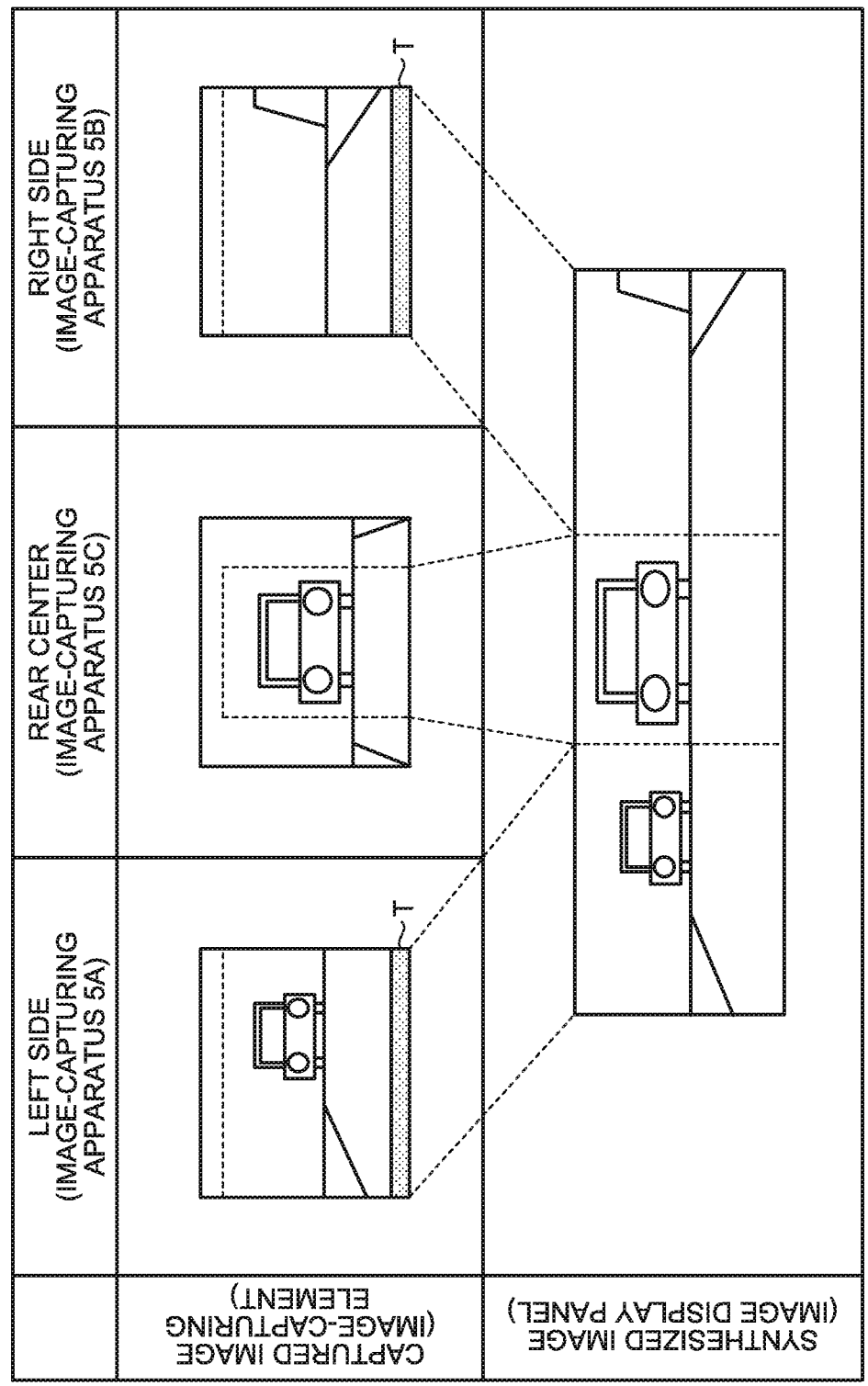
FIG. 16 is a diagram schematically illustrating an example of a correspondence relation between captured images taken by the image-capturing elements and a synthesized image displayed on the image display panel according to a third embodiment of the present invention.
Figure 17:
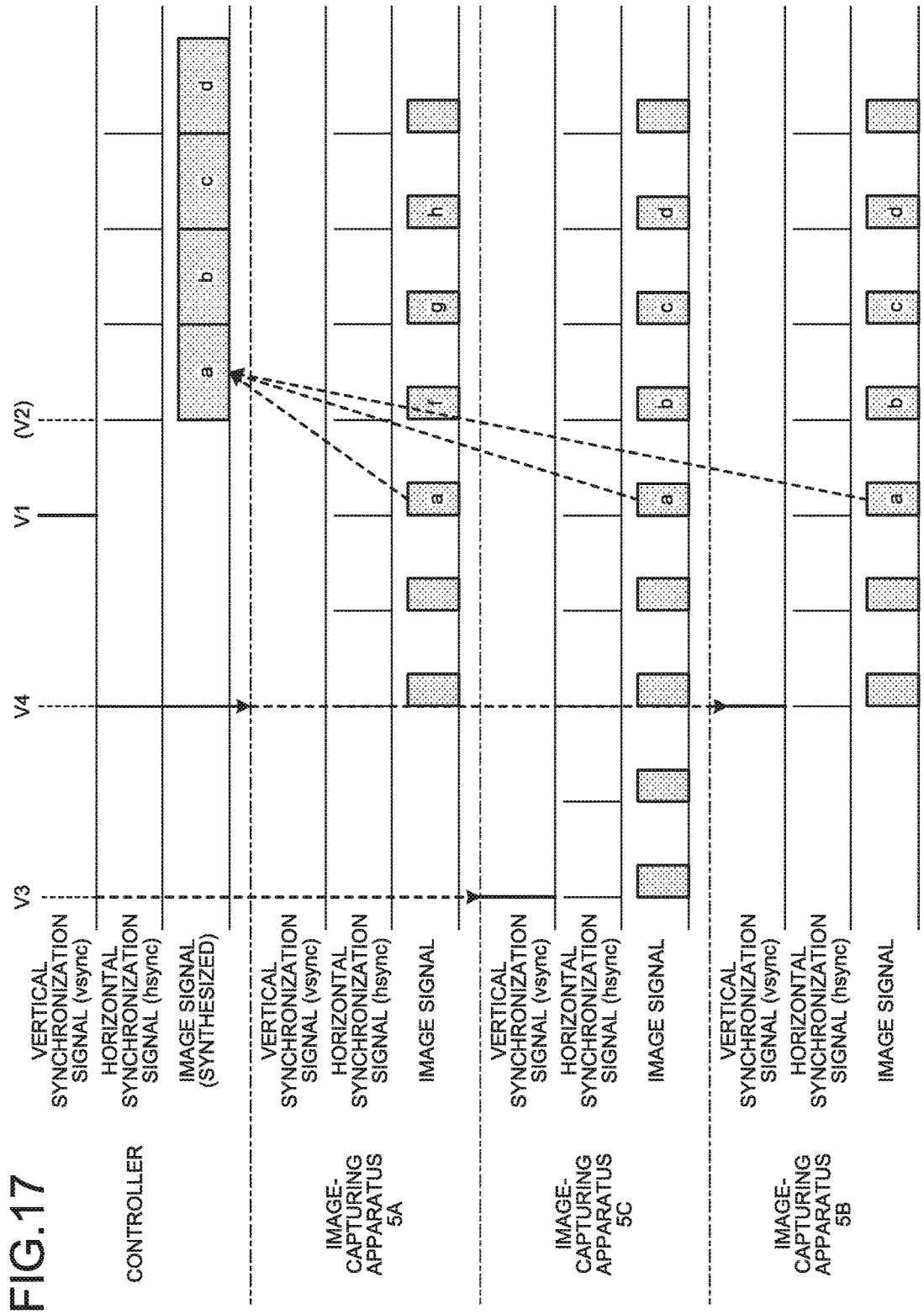
FIG. 17 is a timing chart of a relation between the output timings of the vertical synchronization signals and the horizontal synchronization signals and the output timings of the image signals in units of lines from the image-capturing apparatuses according to the third embodiment.

FIG. 16 is a diagram schematically illustrating an example of a correspondence relation between captured images taken by the image-capturing elements 72A, 72B, and 72C and a synthesized image displayed on the image display panel 30 according to the third embodiment. FIG. 17 is a timing chart of a relation between the output timings of the vertical synchronization signals and the horizontal synchronization signals and the output timings of the image signals in units of lines from the image-capturing apparatuses 5 according to the third embodiment. The signal transmitter 81 of the controller 10 according to the third embodiment outputs the display control vertical synchronization signal used for display control on the image display panel 30 at a timing different from the output timing of the vertical synchronization signal to the image-capturing apparatuses 5. The synthesizer 82 of the controller 10 is configured to receive the image signals in units of lines started to be output from the image-capturing apparatuses 5 at the timing of the vertical synchronization signal, and to provide the synthesized image signals in units of lines obtained by synthesizing the image signals in units of lines output at the output timing of the display control vertical synchronization signal. In other words, the synthesizer 82 of the controller 10 according to the third embodiment synthesizes the image signals in units of lines output at the output timing of the display control vertical synchronization signal, out of the image signals in units of lines started to be output from the image-capturing elements 72A, 72B, and 72C of the image-capturing apparatuses 5 at the timing of the vertical synchronization signal, as the image signals in units of lines to be output in the first display line of the image display panel 30.

As illustrated in FIG. 16, for example, the display system of the third embodiment can display partial images in units of lines on the image display panel 30 using part of the images in units of lines taken by the image-capturing elements 72A, 72B, and 72C of the image-capturing apparatuses 5. To perform the display described above, the controller 10 according to the third embodiment outputs the display control vertical synchronization signal used for display control on the image display panel 30 at a timing different from the output timing of the vertical synchronization signal to the image-capturing apparatuses 5. Specifically, assume a case where the controller 10 synthesizes images of the fifth and subsequent lines taken by the image-capturing element 72C of the image-capturing apparatus 5C with images of the third and subsequent lines taken by the image-capturing element 72A of the image-capturing apparatus 5A and the image-capturing element 72B of the image-capturing apparatus 5B such that the synthesized image obtained by synthesizing the image of the fifth line taken by the image-capturing element 72C with the images of the third line taken by the image-capturing elements 72A and 72B corresponds to an image of the top line (first line) in the image display panel 30, for example. In this case, as illustrated in FIG. 17, the controller 10 outputs a vertical synchronization signal V3 to the image-capturing apparatus 5C first. After a time of two horizontal synchronization signals (2H time) has elapsed, the controller 10 outputs a vertical synchronization signal V4 to the image-capturing apparatuses 5A and 5B. Subsequently, the controller 10 outputs the display control vertical synchronization signal V2 at a display start timing. As a result, the controller 10 can acquire image signals making up the synthesized image used for driving the first line of the image display panel 30. The image signals making up the synthesized image used for the first line are the image signals of the fifth line that are output from the image-capturing element 72C of the image-capturing apparatus 5C at a timing of the horizontal synchronization signal output immediately before the timing of V2 and acquired at the timing of the horizontal synchronization signal, and the image signals of the third line output from the image-capturing element 72A of the image-capturing apparatus 5A and the image-capturing elements 72B of the image-capturing apparatus 5B. The portions in the images described with reference to FIG. 16 and the specific numerical values of the timings described with reference to FIG. 17 are given as an example only, and the present invention is not limited thereto. The portions and the numerical values may be appropriately changed depending on the portion of the image to be displayed.

The number of lines of each of the image-capturing elements 72A, 72B, and 72C according to the third embodiment is preferably larger than the number of lines of the image display panel 30. The number of lines constituting the partial images in units of lines to be displayed on the image display panel 30 out of all the images in units of lines taken by the image-capturing elements 72A, 72B, and 72C according to the third embodiment is preferably equal to the number of lines of the image display panel 30. If the conditions described above are satisfied, the display system of the third embodiment can display the partial images in units of lines on the image display panel 30 simply by synthesizing the images in units of lines output from the image-capturing elements 72A, 72B, and 72C at the timings of the horizontal synchronization signals relating to scanning on the image display panel 30. The display system of the third embodiment has a period in which no horizontal synchronization signal for scanning on the image display panel 30 is output before outputting the vertical synchronization signal for indicating start of the image of the next frame. This configuration can facilitate its truncating line images on the bottom side, such as a redundant portion T illustrated in FIG. 16.

Figure 18:
FIG. 18 is a diagram for schematically explaining an example of reduction in a column direction.
Figure 19:
FIG. 19 is a diagram for schematically explaining an example of enlargement in the column direction.

In the example illustrated in FIG. 16, the display system performs enlargement in the row direction described in the second embodiment besides extraction of the partial images in units of lines. The display system can perform image processing according to the second embodiment and generation of synthesized images according to the third embodiment simultaneously. Naturally, the display system can perform only the image processing according to the second embodiment or only the generation of synthesized images according to the third embodiment. The modification described above may be applied to the second embodiment, the third embodiment, or the combination of the second and the third embodiments. The display system can perform enlargement or reduction in the column direction. FIG. 18 is a diagram for schematically explaining an example of reduction in the column direction. FIG. 19 is a diagram for schematically explaining an example of enlargement in the column direction. Specifically, to perform reduction, a component (e.g., the image processors 85A, 85B, and 85C) of the controller 10 may receive data of a plurality of lines from the image-capturing apparatus 5 and then perform processing of synthesizing the data into data of one line and outputting the synthesized data as illustrated in FIG. 18, for example. To perform enlargement, the component may receive data of one line from the image-capturing apparatus 5 and then perform processing of outputting the data to a plurality of lines as illustrated in FIG. 19, for example. With the processing described above, the display system can increase or reduce the number of the lines in the column direction by constant multiplication. While FIGS. 18 and 19 respectively illustrate reduction and enlargement performed on lines at a ratio of one to two, the ratio of the number of lines before and after the processing in enlargement and reduction may be arbitrarily determined.

The extraction portion in the captured images, the degree of enlargement or reduction performed by the image processors 85A, 85B, and 85C, and other settings according to the second and the third embodiments may be changed depending on the conditions. The degree of enlargement or reduction (the number or the ratio of lines to be subjected to enlargement or reduction) and other settings may be changed depending on the direction and the speed of movement of the movable body, for example. Specifically, the extraction portion in the captured images and the degree of enlargement or reduction performed by the image processors 85A, 85B, and 85C may be changed depending on whether the car is moving forward or backward. The degree of enlargement or reduction may be changed depending on the movement speed of the car. To set the degree of enlargement or reduction performed by the image processors 85A, 85B, and 85C, the controller 10 may include a record holder 86 (refer to FIG. 14) used for the settings in the circuit, for example. To control the extraction portion in the captured images, a control circuit 75 (refer to FIG. 14) may be provided for each of the image-capturing apparatuses 5, and the control circuit 75 may control the extraction portion. The degree of enlargement or reduction and other settings may be adjusted based on angle-of-view change instructions and other instructions issued by a user, such as persons on board and car mechanics.

The display system may use circuits, such as the control circuits 75, provided for the respective image-capturing apparatuses 5 to exclusively output partial image signals in units of lines specified for the respective image-capturing elements 72A, 72B, and 72C. In other words, the lines to be output may be limited when the image signals are output from the image-capturing apparatuses 5. In this case, the display system can output data similar to that in the example illustrated in FIG. 16 without performing the timing control illustrated in FIG. 17.

Fourth Embodiment

The following describes a fourth embodiment of the present invention. In the description of the fourth embodiment, components similar to those according to the first embodiment are denoted by the same reference numerals, and explanation thereof may be omitted.

FIG. 20 is a timing chart of a relation between the output timings of the vertical synchronization signals and the horizontal synchronization signals and the output timings of the image signals in units of lines from the image-capturing apparatuses 5 according to the fourth embodiment. The controller 10 according to the fourth embodiment outputs the vertical synchronization signal. The controller 10 is configured to receive the image signals in units of lines output from the respective image-capturing apparatuses 5 at different timings. The output timings of the image signals in units of lines output from the respective image-capturing apparatuses 5 correspond to timings when respective delay times have elapsed since the output timing of the vertical synchronization signal depending on the display positions in the row direction in the image display panel. The synthesizer 82 synthesizes the image signals in units of lines output from the respective image-capturing apparatuses 5 such that the image signals are connected in the row direction in chronological order. In other words, the synthesizer 82 provides the synthesized image signals in units of lines by connecting the image signals in units of lines output from the respective image-capturing apparatuses 5 in order of receipt.

Specifically, as illustrated in FIG. 20, the three image-capturing apparatuses 5A, 5B, and 5C according to the fourth embodiment have settings of delay times DA, DB, and DC different from each other, respectively, from the input timing of the start signal. The delay time DA, which is the shortest one, corresponds to a time between the output timing of the vertical synchronization signal and the output timing of the horizontal synchronization signal corresponding to the first line. The delay time DC, which is the second shortest one, corresponds to a time obtained by adding the delay time DA to a time for the image-capturing element 72A of the image-capturing apparatus 5A to output the image signals in units of lines of the first line. The delay time DB, which is the longest one, corresponds to a time obtained by adding the delay time DA to the total time for the image-capturing elements 72A and 72C of the image-capturing apparatuses 5 (image-capturing apparatuses 5A and 5C) other than the image-capturing apparatus 5B to sequentially output the image signals in units of lines of the first line.

The image-capturing apparatuses 5 according to the fourth embodiment start to output the image signals in units of lines at timings when the respective delay times DA, DB, and DC have elapsed since the output timing of the vertical synchronization signal. Specifically, in the example illustrated in FIG. 20, the output timings of the image signals in units of lines output from the three image-capturing apparatuses 5A, 5B, and 5C correspond to the timings when the delay times DA, DB, and DC, respectively, have elapsed since the output timing of the vertical synchronization signal, the delay times DA, DB, and DC depending on the display positions in the row direction in the image display panel 30. The image-capturing elements 72A, 72B, and 72C of the image-capturing apparatuses 5A, 5B, and 5C, respectively, output the image signals in units of lines at the timings described above. With this mechanism, the controller 10 can perform scanning (horizontal scanning) in the line direction in the image display panel 30 simply by sequentially outputting the sequentially received image signals in units of lines to the image display panel drive circuit 40 as illustrated in FIG. 20. In other words, the order of the image signals in units of lines sequentially transmitted from the image-capturing elements 72A, 72B, and 72C of the three image-capturing apparatuses 5A, 5B, and 5C to the controller 10 according to the fourth embodiment corresponds to the order of the display output contents (gradation values) in the line direction in the image display panel 30 without any change.

The output start timing of the horizontal synchronization signals used for scanning in the image display panel 30 according to the fourth embodiment is not limited to a timing after the 1H time has elapsed since the output timing of the vertical synchronization signal and may be a timing after a time shorter than the 1H time has elapsed. Specifically, the time between the output timing of the vertical synchronization signal and the output timing of the horizontal synchronization signal used for scanning can be reduced to the shortest delay time (e.g., the delay time DA).

In the example illustrated in FIG. 20, the delay times DA, DB, and DC are set such that the image signals in units of lines are output in order of the image signals from the image-capturing apparatus 5A, the image signals from the image-capturing apparatus 5C, and the image signals from the image-capturing apparatus 5B, based on the arrangement of the three image-capturing apparatuses 5A, 5C, and 5B and the scanning order in the row direction in the image display panel 30. The connection order of the image signals in units of lines for generation of synthesized images may be arbitrarily determined.

In FIG. 20, the image signals in units of lines are output according to the horizontal synchronization signals formed by the image-capturing apparatuses 5A, 5B, and 5C based on the delay times DA, DB, and DC from the first vertical synchronization signal V1. This is given as an example only, and the present invention is not limited thereto. FIGS. 21 and 22 are timing charts of a relation between the output timings of the vertical synchronization signals and the horizontal synchronization signals and the output timings of the image signals in units of lines from the image-capturing apparatuses 5 according to modifications of the fourth embodiment. As illustrated in FIG. 21, for example, the controller 10 according to a modification of the fourth embodiment may output the horizontal synchronization signals similarly to the controller 10 according to the first embodiment and other embodiments. The controller 10 according to the modification may set respective delay times with respect to the timings of the horizontal synchronization signals for the image-capturing apparatuses 5A, 5B, and 5C, thereby causing the image-capturing apparatuses 5A, 5B, and 5C to output the image signals in units of lines based on the settings. Alternatively, as illustrated in FIG. 22, for example, the controller 10 according to another modification of the fourth embodiment may output the horizontal synchronization signals to which respective delay times are set for the image-capturing apparatuses 5A, 5B, and 5C, thereby causing the image-capturing apparatuses 5A, 5B, and 5C to output the image signals in units of lines based on the horizontal synchronization signals. In the modifications according to the fourth embodiment, as illustrated in FIGS. 21 and 22, no delay time (0) is set to the horizontal synchronization signal for the image-capturing apparatus (e.g., the image-capturing apparatus 5A) that outputs images to be displayed first. By contrast, delay times DD and DE are set to the horizontal synchronization signals for the other image-capturing apparatuses (e.g., the image-capturing apparatuses 5C and 5B).

According to the fourth embodiment, synthesized images in the correct arrangement order of pixels in the image display panel 30 can be obtained simply by sequentially transferring, to the image display panel drive circuit 40, the image signals in units of lines sequentially transmitted from the three image-capturing apparatuses 5A, 5B, and 5C to the controller 10. With this mechanism, the display system of the fourth embodiment requires no line buffer used to generate the synthesized images. As a result, the display system of the fourth embodiment can finish processing from image-capturing to display without any time for transferring data via line buffers (e.g., the synthesis line buffer 83 and the output line buffer 84) according to the first embodiment. Because no line buffer is required, the display system of the fourth embodiment can further reduce a delay time from when images are taken by a plurality of image-capturing apparatuses 5 to when synthesized images obtained by synthesizing the images taken by the image-capturing apparatuses 5 are displayed. The display system of the fourth embodiment can further improve the real-time property when the images taken by the image-capturing apparatuses 5 are synthesized and displayed.

Similarly to the first embodiment, the number of pixels (P) in the row direction in the image display panel 30 according to the fourth embodiment is equal to the number of pixels in the row direction obtained by connecting the image signals in units of lines output from the image-capturing elements 72A, 72B, and 72C of the three image-capturing apparatuses 5A, 5B, and 5C, respectively, in the row direction. The number of lines of the image-capturing elements 72A, 72B, and 72C according to the first embodiment is equal to the number of lines of the image display panel 30 (refer to FIG. 8).

The delay times are individually set in advance to the timing generators 73, for example. Specifically, in the example illustrated in FIG. 20, the three image-capturing apparatuses 5A, 5B, and 5C automatically start to output, based on the timing of the vertical synchronization signal, the image signals in units of lines of the first line at the timings corresponding to the delay times DA, DB, and DC, respectively. In the fourth embodiment, the phases of the horizontal synchronization signals in the respective image-capturing apparatuses 5 are synchronized with the phase of the horizontal synchronization signals used for display drive of the image display panel 30. To achieve the synchronization in the fourth embodiment, the phases between the apparatuses are synchronized using a phase locked loop (PLL), for example.

The display systems of the embodiments or the like of the present invention including the modifications have described a liquid crystal display apparatus as an example of the display apparatus 20. Other application examples may include all types of flat-panel display apparatuses, such as organic electroluminescence (EL) display apparatuses and other self-luminous display apparatuses. The present invention is also applicable to display apparatuses having any size, including small to medium display apparatuses and large display apparatuses.

While the number of image-capturing apparatuses according to the first embodiment is three in the description with reference to FIG. 1, this is given as a specific example of image-capturing apparatuses, and the present invention is not limited thereto. The number of image-capturing apparatuses simply needs to be two or more. The synthesizer synthesizes two or more output contents obtained by image-capturing and outputs the synthesized data to the display device.

The car may include only part of the rear-view mirror unit 2, the side-view mirror units 3A and 3B, and the CID unit 4. Part of the apparatuses included in the units may be integrated into one unit. The number of display apparatuses included in the display system, for example, may be one or more. While the display apparatus of the rear-view mirror unit 2 according to the embodiments and the modification performs synthesis display, the position of the display apparatus that performs synthesis display is not limited thereto. Alternatively, the display apparatus of the side-view mirror units 3A and 3B or the CID unit 4 may perform synthesis display.

In the embodiments or the like of the present invention including the modifications, a line corresponds to one pixel row. However, the present invention is not limited thereto. A line may include a plurality of rows (the number of which is smaller than that of all the rows). Specifically, the display apparatus may receive output of data of a plurality of rows from image-capturing elements of a plurality of image-capturing apparatuses and perform synthesis display row by row.

The embodiments or the like of the present invention including the modifications have described a car as an example of the movable body. The present invention is applicable not only to cars including three or more wheels and a body that enables passengers to sit on sheets in a cabin but also to two-wheeled vehicles including a body. The present invention is also applicable to other movable bodies such as motorboats.

While the controller 10 according to the embodiments or the like of the present invention including the modifications is provided independently of the display apparatus 20, the controller 10 may be included in the display apparatus 20. In other words, a circuit having the same functions as those of the controller 10 may be one of the circuits in the display apparatus 20. Part of the components, such as the line buffers (e.g., the synthesis line buffer 83 and the output line buffer 84), may be provided on the substrate of the image display panel 30 of the display apparatus 20, for example. The controller 10 according to the embodiments and the modification, for example, may be provided in a display driver IC or an external control circuit, such as a memory control unit (MCU). In a case where the controller 10 is provided in the display driver IC, it may be arranged on the same substrate as that of the display panel by chip on glass (COG) or on another substrate.

Wired or wireless communications may be used to transmit the signals between the apparatuses in the image-capturing apparatuses, the controllers, and the display apparatuses. In other words, components corresponding to the image-capturing apparatus 5, the controller 10, and the display apparatus 20 may be provided to respective apparatuses (terminals), for example. Specifically, the display system can transmit output signals in units of lines output from an image-capturing apparatus attached to a remote-controllable movable body to a controller provided to a portable electronic apparatus different from the movable body by wireless communications. The display system can display the output signals on a display apparatus provided to the portable electronic apparatus or another portable electronic apparatus.

The present invention provides advantageous effects clearly defined by the description in this specification or appropriately conceivable by those skilled in the art out of other advantageous effects provided by the aspects described in the embodiments or the like of the present invention including the modifications.

What is claimed is:

1. A display system comprising:
a controller; and
an image display panel,
wherein the controller includes
a signal transmitter configured to output at least a vertical synchronization signal to a plurality of image-capturing apparatuses; and
a synthesizer configured to provide synthesized image signals in units of lines obtained by synthesizing, in units of lines, image signals in units of lines output from the respective image-capturing apparatuses at a timing corresponding to a horizontal synchronization signal formed in a predetermined cycle based on an output timing of the vertical synchronization signal,
wherein the image display panel is configured to display sequentially, in units of lines, the synthesized image signals in units of lines,
wherein the signal transmitter is configured to output a display control vertical synchronization signal used for display control on the image display panel at a timing different from the output timing of the vertical synchronization signal to the image-capturing apparatuses, and
wherein the synthesizer is configured to receive the image signals in units of lines started to be output from the image-capturing apparatuses at the timing of the vertical synchronization signal, and to provide the synthesized image signals in units of lines obtained by synthesizing the image signals in units of lines output at the output timing of the display control vertical synchronization signal.

2. The display system according to claim 1,
wherein the signal transmitter is configured to output the vertical synchronization signal and the horizontal synchronization signal, and
wherein the vertical synchronization signal serves as a start signal for ordering start of output of the image signals in units of lines.

3. The display system according to claim 1,
wherein the signal transmitter is configured to output the vertical synchronization signal and the horizontal synchronization signal in response to a start signal output from one of the image-capturing apparatuses.

4. The display system according to claim 1,
wherein the controller includes an image processor configured to perform image conversion processing including at least one of reduction and enlargement of an image.

5. The display system according to claim 4,
wherein the image processor is configured to perform the image conversion processing on the image signals in units of lines output from the respective image-capturing apparatuses at respective ratios of image conversion processing.

6. A display system comprising:
a controller; and
an image display panel,
wherein the controller includes
a signal transmitter configured to output at least a vertical synchronization signal to a plurality of image-capturing apparatuses; and
a synthesizer configured to provide synthesized image signals in units of lines obtained by synthesizing, in units of lines, image signals in units of lines output from the respective image-capturing apparatuses at a timing corresponding to a horizontal synchronization signal formed in a predetermined cycle based on an output timing of the vertical synchronization signal,
wherein the image display panel is configured to display sequentially, in units of lines, the synthesized image signals in units of lines,
wherein the controller is configured to receive the image signals in units of lines output from the respective image-capturing apparatuses at different timings that correspond to timings when respective delay times have elapsed since the output timing of the vertical synchronization signal, the delay times depending on a display position in a row direction in the image display panel, and
wherein the synthesizer is configured to provide the synthesized image signals in units of lines by connecting the image signals in units of lines output from the respective image-capturing apparatuses in order of receipt.

7. The display system according to claim 6, wherein the image-capturing apparatuses output captured images in units of lines.

8. A display system comprising:
a controller; and
an image display panel,
wherein the controller includes a signal transmitter configured to output at least a vertical synchronization signal to a plurality of image-capturing apparatuses; and a synthesizer configured to provide synthesized image signals in units of lines obtained by synthesizing, in units of lines, image signals in units of lines output from the respective image-capturing apparatuses at a timing corresponding to a horizontal synchronization signal formed in a predetermined cycle based on an output timing of the vertical synchronization signal, wherein the image display panel is configured to display sequentially, in units of lines, the synthesized image signals in units of lines, wherein the controller is configured to receive a first image signal in units of lines output from a first image-capturing apparatus of the image capturing apparatuses at a timing elapsed a first time since the output timing of the vertical synchronization signal, and wherein the controller is configured to receive a second image signal in units of lines output from a second image-capturing apparatus of the image capturing apparatuses at a timing elapsed a second time different from the first time since the output timing of the vertical synchronization signal.

9. The display system according to claim 8, wherein, the image display panel is configured to display from the first image signal in units of lines to the second image signal in units of lines in order as the synthesized image signal in units of lines, and the first time is shorter than the second time.

10. The display system according to claim 8, wherein the image-capturing apparatuses output captured images in units of lines.

11. The display system according to claim 1, wherein the image-capturing apparatuses output captured images in units of lines.

12. A display method for displaying an image by a display apparatus including an image display panel configured to display sequentially, in units of lines, synthesized image signals in units of lines, the display method comprising:

outputting at least a vertical synchronization signal to a plurality of image-capturing apparatuses;

outputting a display control vertical synchronization signal used for display control on the image display panel at a timing different from the output timing of the vertical synchronization signal to the image-capturing apparatuses;

receiving the image signals in units of lines started to be output from the image-capturing apparatuses at the timing of the vertical synchronization signal;

synthesizing, in units of lines, image signals in units of lines output from the respective image-capturing apparatuses at a timing corresponding to a horizontal synchronization signal formed in a predetermined cycle based on an output timing of the vertical synchronization signal;

providing the synthesized image signals in units of lines obtained by synthesizing the image signals in units of lines output at the output timing of the display control vertical synchronization signal; and sequentially displaying, in units of lines, the synthesized image signals in units of lines.

* * * * *